(12) United States Patent  (10) Patent No.: US 8,760,471 B2
Ihara et al.  (45) Date of Patent: Jun. 24, 2014

(54) INFORMATION PROCESSING SYSTEM, INFORMATION PROCESSING METHOD AND PROGRAM FOR SYNTHESIZING AND DISPLAYING AN IMAGE

(75) Inventors: Noboru Ihara, Tokyo (JP); Kazuhiro Sasao, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 13/497,029

(22) PCT Filed: Mar. 30, 2011

(86) PCT No.: PCT/JP2011/057959
§ 371 (c)(1),
(2), (4) Date: Mar. 19, 2012

(87) PCT Pub. No.: WO2011/135968
PCT Pub. Date: Nov. 3, 2011

(65) Prior Publication Data
US 2013/0120449 A1 May 16, 2013

(30) Foreign Application Priority Data

Apr. 28, 2010 (JP) ................................. 2010-104071
Mar. 24, 2011 (JP) ................................. 2011-066198

(51) Int. Cl.
G09G 5/00 (2006.01)
G06F 3/00 (2006.01)
(52) U.S. Cl.
USPC ............ 345/633; 345/632; 715/707; 715/708
(58) Field of Classification Search
CPC ...... H04L 63/20; H04L 67/306; G06Q 10/06; G06F 21/10
USPC ........................... 345/632, 633; 715/707–713
See application file for complete search history.

(56) References Cited

U.S. PATENT DOCUMENTS 4,964,077 A * 10/1990 Eisen et al. .................... 715/707
5,680,541 A * 10/1997 Kurosu et al. .................... 714/26

(Continued)

FOREIGN PATENT DOCUMENTS

JP 2000-098019 A 4/2000
JP 2002-538543 A 11/2002

(Continued)

OTHER PUBLICATIONS

Hirotake Ishii, Zhiqiang Bian, Hidenori Fujino, Tomoki Sekiyama, Toshinori Nakai, Akihisa Okamoto, Hiroshi Shimoda, Masanori Izumi, Yoshinori Kanehira, Yoshitsugu Morishita, Augmented Reality Applications for Nuclear Power Plant Maintenance Work, 2008, International Symposoum on Symbiotic Nuclear Power System for 21 Century (IAANP2008), p. 262-268.*

(Continued)

*Primary Examiner* — Xiao Wu
*Assistant Examiner* — Michael J Cobb
(74) *Attorney, Agent, or Firm* — Arent Fox LLP

(57) ABSTRACT

A failure analysis apparatus obtains information associated with an operational status of a data center, determines information regarding fault repair work for the data center, based on the information associated with the operational status, and transmits the information regarding the fault repair work to a head mounted display (HMD). The HMD synthesizes and presents computer graphics image data for providing guidance for a method of the fault repair work, with an image of real space, based on the information regarding the fault repair work. After the fault repair work according to the guidance presented by the HMD, if the information associated with the operational status of the data center is newly obtained, the failure analysis apparatus newly determines the information regarding the fault repair work for the data center based on the information associated with the operational status, and transmits the information to the HMD.

9 Claims, 19 Drawing Sheets

(56) References Cited

U.S. PATENT DOCUMENTS

| | | | |
|---|---|---|---|
| 6,941,248 B2 | 9/2005 | Friedrich et al. | |
| 7,251,585 B2* | 7/2007 | Rossmann et al. | 702/184 |
| 7,324,081 B2 | 1/2008 | Friedrich et al. | |
| 7,372,451 B2* | 5/2008 | Dempski | 345/158 |
| 7,383,148 B2* | 6/2008 | Ahmed | 702/127 |
| 2002/0044104 A1 | 4/2002 | Friedrich et al. | |
| 2002/0046368 A1 | 4/2002 | Friedrich et al. | |
| 2002/0049566 A1 | 4/2002 | Friedrich et al. | |
| 2002/0067372 A1 | 6/2002 | Friedrich et al. | |
| 2002/0069072 A1 | 6/2002 | Friedrich et al. | |
| 2003/0115088 A1* | 6/2003 | Thompson | 705/7 |
| 2004/0220847 A1* | 11/2004 | Ogushi et al. | 705/9 |
| 2005/0060217 A1* | 3/2005 | Douglas et al. | 705/9 |
| 2007/0300174 A1* | 12/2007 | Macbeth et al. | 715/772 |
| 2008/0005617 A1* | 1/2008 | Maggiore et al. | 714/30 |
| 2008/0098763 A1* | 5/2008 | Yamaoka | 62/259.2 |
| 2008/0100570 A1 | 5/2008 | Friedrich et al. | |
| 2008/0151313 A1* | 6/2008 | Ishimaru | 358/400 |
| 2008/0300828 A1 | 12/2008 | Kojima | |
| 2009/0153321 A1* | 6/2009 | Lange et al. | 340/539.1 |
| 2009/0272794 A1* | 11/2009 | Lange et al. | 235/375 |
| 2010/0178058 A1* | 7/2010 | Kozischek et al. | 398/115 |
| 2010/0205013 A1* | 8/2010 | Guyan et al. | 705/4 |
| 2011/0025468 A1* | 2/2011 | Longhurst et al. | 340/10.1 |
| 2012/0242698 A1* | 9/2012 | Haddick et al. | 345/633 |
| 2013/0010068 A1* | 1/2013 | Tiernan et al. | 348/46 |
| 2013/0111392 A1* | 5/2013 | Muraki | 715/776 |

FOREIGN PATENT DOCUMENTS

| | | | |
|---|---|---|---|
| JP | 2006099405 A * | 4/2006 | |
| JP | 2007034712 A * | 2/2007 | |
| JP | 2008-201101 A | 9/2008 | |
| WO | WO 2007/096971 A1 | 8/2007 | |

OTHER PUBLICATIONS

Nassir Navab, Industrial Augmented Reality (IAR): Challenges in Design and Commercializatio of Killer Apps, 2003, Proceedings of the Second IEEE and ACM International Symposium on Mixed and Augmented Reality, pp. 2-6.*

Holger Regenbrecht, Gregory Baratoff, Wilhelm Wilke, Augmented Reality Projects in the Automotive and Aerospace Industries, 2005, IEEE Computer Graphics and Applications, 25(6):48-56.*

International Preliminary Report dated Dec. 20, 2012, 2 pages.

Written Opinion of the International Searching Authority dated May 10, 2011, 2 pages.

Andrea F. Abate, "ASSYST: Avatar baSed SYStem mainTenance", Radar Conference 2008, IEEE, May 26, 2008, pp. 1-6.

Cindy M. Robertson, et al., "An Evaluation of Graphical Context as a Means for Ameliorating the Effects of Registration Error", IEEE Transactions on Visualization and Computer Graphics, vol. 15, No. 2, Mar. 1, 2009, pp. 179-192.

Paula Savioja, et al., "Developing a Mobile, Service-Based Augmented Reality Tool for Modern Maintenance Work", Virtual Reality, Springer Berlin Heidelberg, pp. 554-563, 2007.

Simon Julier, et al., "Information Filtering for Mobile Augmented Reality", Augmented Reality 2000, IEEE and ACM International Symposium in Munich, Germany, Oct. 5, 2000, pp. 3-11.

Supplemental European Search Report, dated Feb. 8, 2013, 10 pages.

* cited by examiner

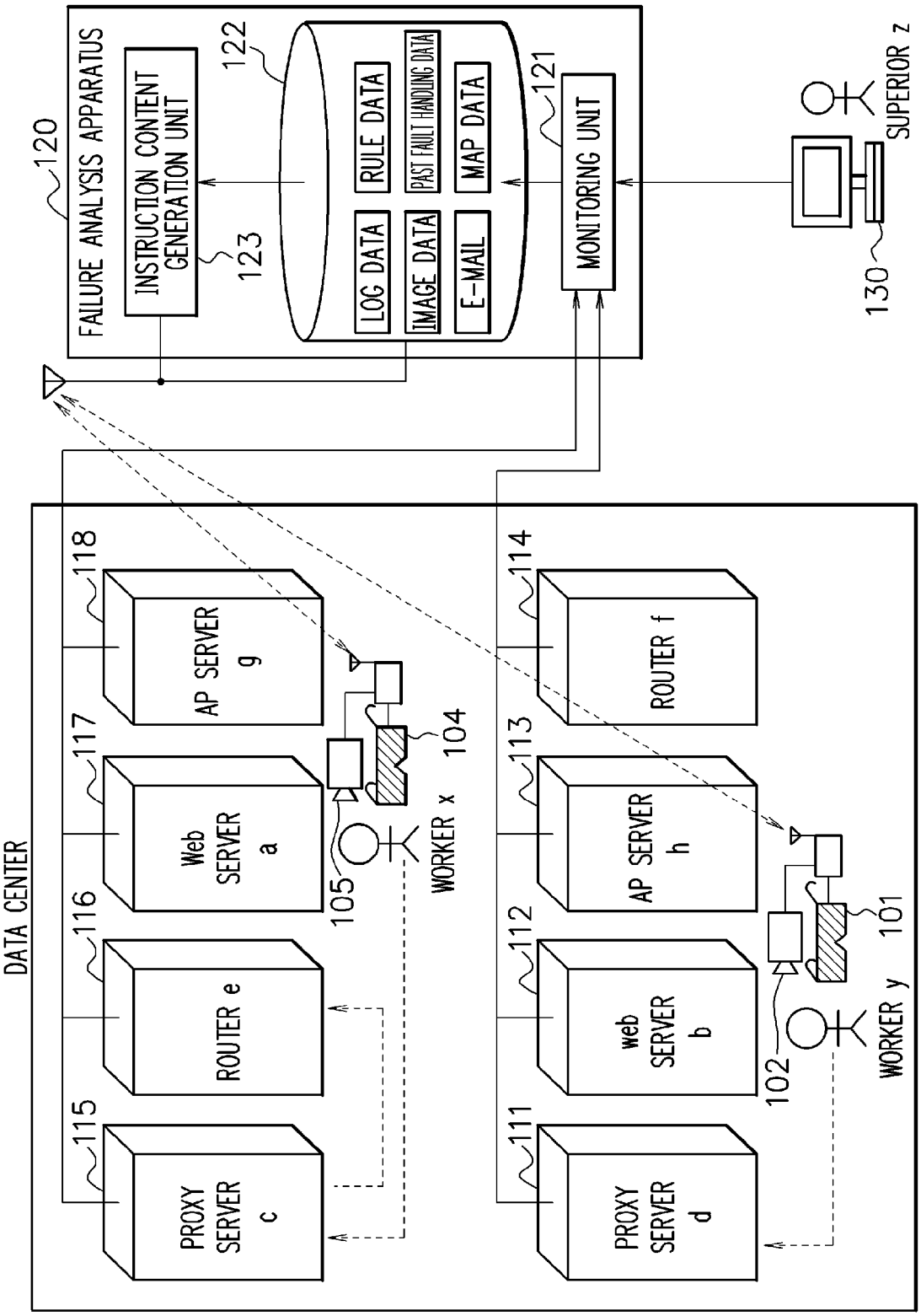

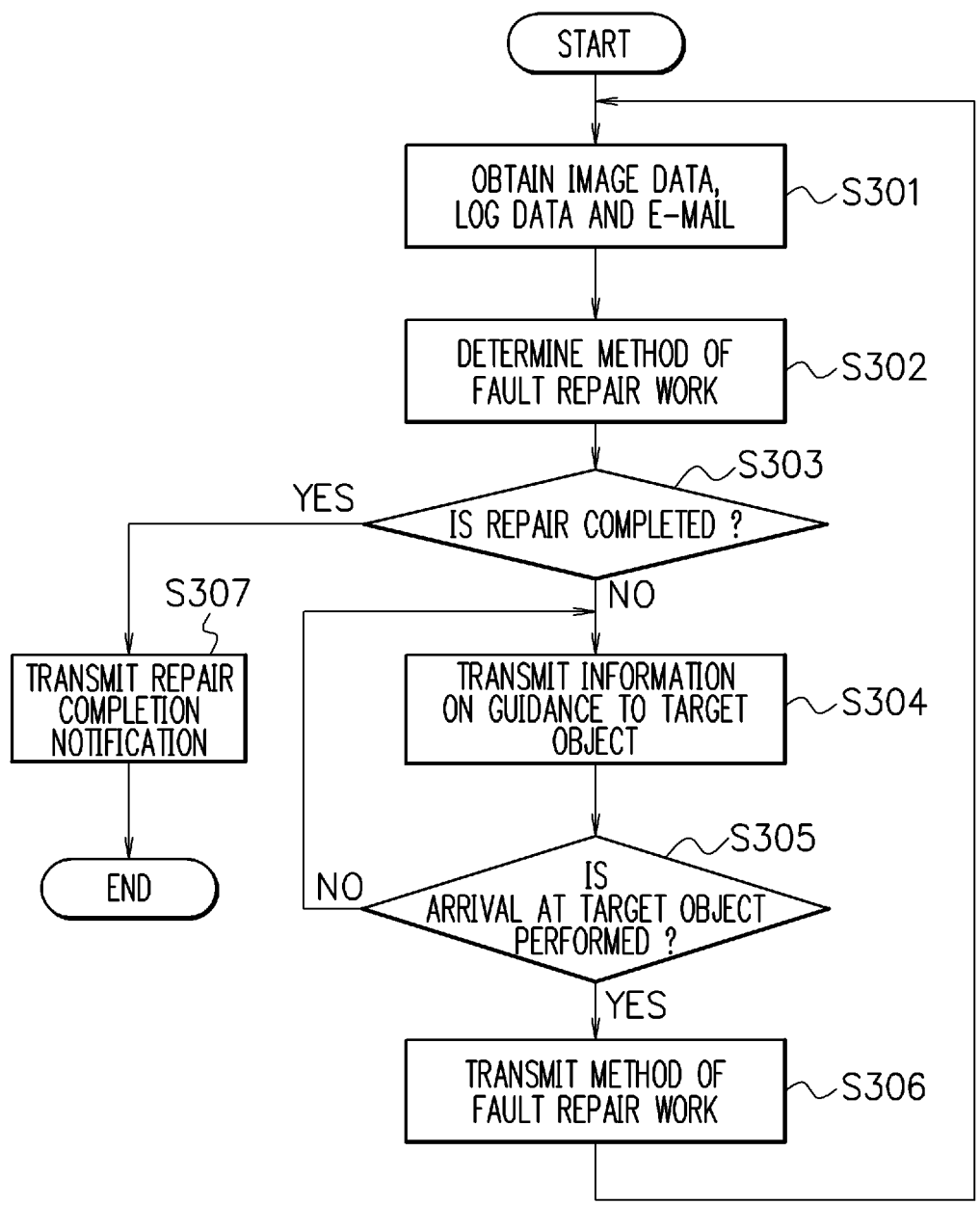

F I G. 7
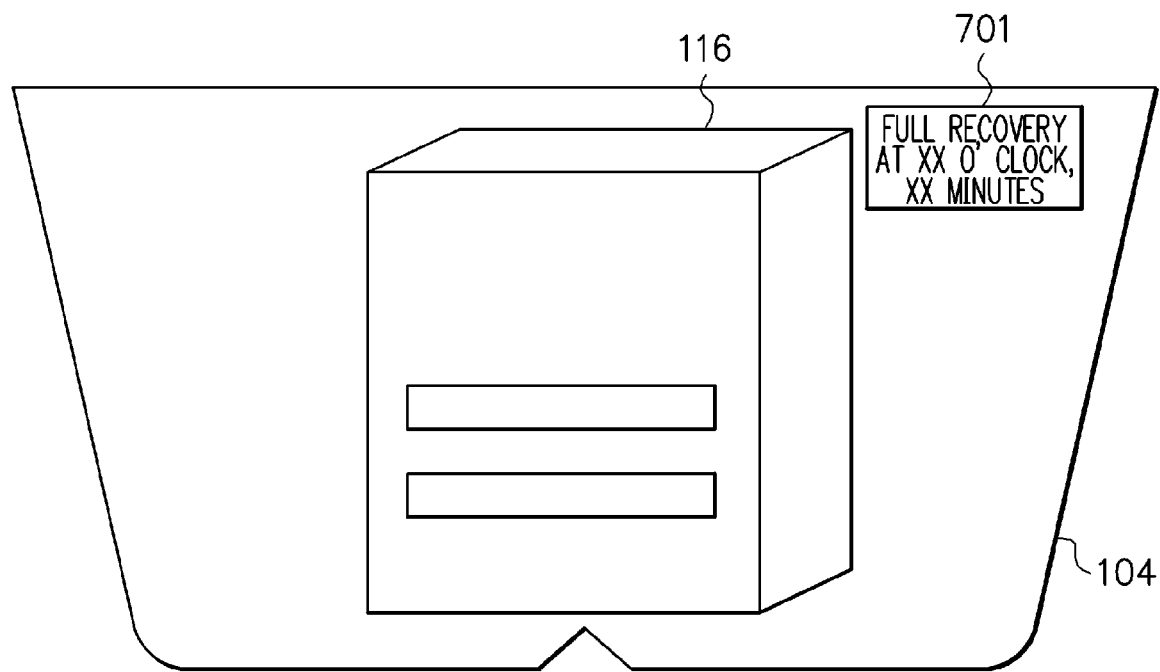

F I G. 8

| CHECK ITEM | FAULT REPAIR WORK 1 | FAULT REPAIR WORK 2 | FAULT REPAIR WORK 3 | ... | FAULT REPAIR WORK n |
|---|---|---|---|---|---|
| IS THERE NO Ping RESPONSE ? | 10 | 5 | 0 | ... | 5 |
| ... | ... | ... | ... | ... | ... |
| IS THERE ANY PROBLEM WITH PROCESS ? | 0 | 10 | 5 | ... | 1 |
| IS THERE ANY PROBLEM WITH ERROR LOG ? | 0 | 5 | 10 | ... | 3 |
| IS THERE ANY PROBLEM WITH ACCESS LOG ? | 0 | 10 | 10 | ... | 5 |

FIG. 9

PROFICIENCY LEVEL DETERMINATION TABLE 1

| WORK ID | WORKING TIME (OR MORE) | WORKING TIME (LESS THAN) | PROFICIENCY LEVEL |
|---|---|---|---|
| WORK 1 |  | 5 MINUTES | A |
| WORK 1 | 5 MINUTES | 10 MINUTES | B |
| WORK 1 | 10 MINUTES |  | C |
| WORK 2 |  | 10 MINUTES | A |
| WORK 2 | 10 MINUTES | 30 MINUTES | B |
| ... | ... | ... | ... |
| WORK n |  |  |  |

PROFICIENCY LEVEL DETERMINATION TABLE 2

| WORK ID | WORK SUCCESS RATE (OR MORE) | WORK SUCCESS RATE (LESS THAN) | PROFICIENCY LEVEL |
|---|---|---|---|
| WORK 1 | 90% |  | A |
| WORK 1 | 70% | 90% | B |
| WORK 1 |  | 70% | C |
| WORK 2 | 80% |  | A |
| WORK 2 | 60% | 80% | B |
| ... | ... | ... | ... |
| WORK n |  |  |  |

F I G. 10

WORK CONTENT EXPLANATION TABLE

| WORK ID | PROFICIENCY LEVEL | DESCRIPTION OF WORK CONTENT EXPLANATION |
|---|---|---|
| WORK 1 | A | DESCRIPTION X |
| WORK 1 | B | DESCRIPTION Y |
| WORK 1 | C | DESCRIPTION Z |
| WORK 2 | A | DESCRIPTION a |
| WORK 2 | B | DESCRIPTION b |
| ⋮ | ⋮ | ⋮ |
| WORK n | | |

F I G. 11

WORKER TABLE

| WORKER ID | WORKER NAME | PROFICIENCY LEVEL FOR WORK 1 | PROFICIENCY LEVEL FOR WORK 2 | ... | ABILITY LEVEL |
|---|---|---|---|---|---|
| 001 | WORKER X | A | B | ... | A |
| 002 | WORKER Y | C | C | ... | C |
| .. | .. | .. | .. | ... | .. |

F I G. 12

WORK CONTENT HISTORY TABLE

| WORKER ID | DATE | WORK ID | WORKING TIME | WORK SUCCESS RATE |
|---|---|---|---|---|
| 001 | 20XX/3/1 | WORK 1 | 3 MINUTES | 85% |
| 001 | 20XX/3/2 | WORK 2 | 20 MINUTES | 75% |
| 002 | 20XX/3/3 | WORK 1 | 15 MINUTES | 60% |
| 002 | 20XX/3/4 | WORK 2 | 40 MINUTES | 50% |
| .. | .. | .. | .. | .. |

F I G. 13

REQUIRED ABILITY TABLE

| WORK ID | LOWEST REQUIRED ABILITY LEVEL |
|---|---|
| WORK 1 | C |
| WORK 2 | C |
| WORK 3 | B |
| WORK 4 | A |
| ⋮ | ⋮ |

F I G. 17
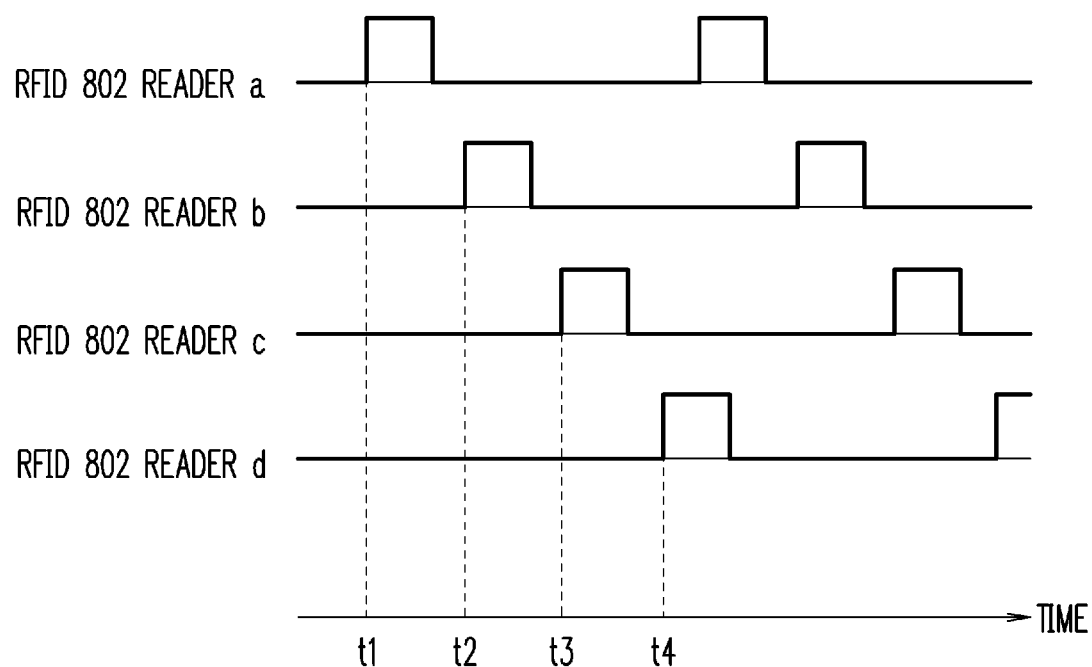

INFORMATION PROCESSING SYSTEM, INFORMATION PROCESSING METHOD AND PROGRAM FOR SYNTHESIZING AND DISPLAYING AN IMAGE

CROSS-REFERENCE TO RELATED APPLICATIONS

This application is a National Stage entry of International Application No. PCT/JP2011/057959, filed Mar. 30, 2011, which claims priority to JP Patent Application No. 2010-104071, filed Apr. 28, 2010, and JP Patent Application No. 2011-066198, filed Mar. 24, 2011. The disclosures of the prior applications are incorporated in their entirety by reference.

TECHNICAL FIELD

The present invention relates to a technique capable of synthesizing and displaying an image of real space and computer graphics image data in a superimposed manner.

BACKGROUND ART

If a fault occurs in a device or the like, a fault point is specified and fault repair work is performed by a worker. For example, as disclosed in Patent Literature 1, there is known a technique for using Augmented Reality (hereinafter, AR) to simplify a removal operation for a paper jam in a copying machine. Specifically, when a paper sheet is not detected by a predetermined sensor within a predetermined time, it is assumed that a paper jam has occurred, and a video of the inside of the copying machine, which has been previously prepared corresponding to a paper jam occurrence position, and an operation procedure are displayed in a superimposed manner. Thereby, a paper jam occurrence point in the copying machine can be easily recognized, and guidance for the removal operation can be easily provided. It should be noted that the AR is a technique for displaying data managed in a computer (hereinafter, computer graphics image data), such as characters, figures, still images or moving images, into a real environment in a superimposed manner to give supplementary information.

CITATION LIST

Patent Literature

Patent Literature 1: Japanese Laid-open Patent Publication No. 2008-201101

SUMMARY OF INVENTION

Technical Problem

The technique disclosed in Patent Literature 1, however, is the case where faults that will occur have been previously supposed, and countermeasures against the supposed faults have been previously defined. For example, a plurality of factors of the faults may also be combined to cause a new fault to occur. In this case, according to the technique disclosed in Patent Literature 1, guidance for optimal fault repair work cannot be provided.

Consequently, an object of the present invention is to provide the guidance for the optimal fault repair work to assist the work even if an unexpected fault has occurred.

Solution to Problem

A first aspect of an information processing system of the present invention is an information processing system including a sense of augmented reality presentation apparatus that is able to synthesize and display an image of real space and computer graphics image data, and a failure analysis apparatus that is able to analyze a fault having occurred in a computer system, wherein the failure analysis apparatus includes obtaining means that obtains information associated with an operational status of the computer system; determination means that determines information regarding fault repair work for the computer system, based on the information associated with the operational status obtained by the obtaining means; and transmission means that transmits the information regarding the fault repair work determined by the determination means, to the sense of augmented reality presentation apparatus, the sense of augmented reality presentation apparatus includes presentation means that synthesizes and presents computer graphics image data for providing guidance for a method of the fault repair work, with the image of the real space, based on the information regarding the fault repair work, and in the failure analysis apparatus, after the fault repair work according to the guidance presented by the sense of augmented reality presentation apparatus, if the information associated with the operational status of the computer system is newly obtained by the obtaining means, the information regarding the fault repair work for the computer system is newly determined by the determination means based on the information associated with the operational status, and the newly determined information regarding the fault repair work is transmitted to the sense of augmented reality presentation apparatus by the transmission means.

An information processing method of the present invention is an information processing method executed by a sense of augmented reality presentation apparatus that is able to synthesize and display an image of real space and computer graphics image data and comprises presentation means, and a failure analysis apparatus that is able to analyze a fault having occurred in a computer system and comprises obtaining means, determination means and transmission means, the method comprising: an obtaining step of obtaining information associated with an operational status of the computer system by the obtaining means; a determination step of determining information regarding fault repair work for the computer system, based on the information associated with the operational status obtained by the obtaining step, by the determination means; a transmission step of transmitting the information regarding the fault repair work determined by the determination step, to the sense of augmented reality presentation apparatus, by the transmission means; and a presentation step of synthesizing and presenting computer graphics image data for providing guidance for a method of the fault repair work, with the image of the real space, based on the information regarding the fault repair work, by the presentation means, wherein after the fault repair work according to the guidance presented by the sense of augmented reality presentation apparatus, if the information associated with the operational status of the computer system is newly obtained by the obtaining means, the information regarding the fault repair work for the computer system is newly determined by the determination means based on the information associated with the operational status, and the newly determined information regarding the fault repair work is transmitted to the sense of augmented reality presentation apparatus by the transmission means.

A program of the present invention is a program for causing a first computer to function as a sense of augmented reality presentation apparatus that is able to synthesize and display an image of real space and computer graphics image data and comprises presentation means, and for causing a second computer to function as a failure analysis apparatus that is able to analyze a fault having occurred in a computer system and comprises obtaining means, determination means and transmission means, the program causing the second computer to execute an obtaining step of obtaining information associated with an operational status of the computer system by the obtaining means; a determination step of determining information regarding fault repair work for the computer system, based on the information associated with the operational status obtained by the obtaining step, by the determination means; and a transmission step of transmitting the information regarding the fault repair work determined by the determination step, to first computer, by the transmission means, the program causing the first computer to execute: a presentation step of synthesizing and presenting computer graphics image data for providing guidance for a method of the fault repair work, with the image of the real space, based on the information regarding the fault repair work, by the presentation means, and the program causing the second computer to execute a step in which, after the fault repair work according to the guidance presented by the first computer, if the information associated with the operational status of the computer system is newly obtained by the obtaining step, the information regarding the fault repair work for the computer system is newly determined by the determination step based on the information associated with the operational status, and the newly determined information regarding the fault repair work is transmitted to the first computer by the transmission step.

A second aspect of the information processing system of the present invention is an information processing system including a sense of augmented reality presentation apparatus that is able to synthesize and display an image of real space and computer graphics image data, and a failure analysis apparatus that is able to analyze a fault having occurred in a repair target object, wherein the failure analysis apparatus includes obtaining means that obtains information associated with an operational status of the repair target object; determination means that determines information regarding fault repair work for the repair target object, based on the information associated with the operational status obtained by the obtaining means; and transmission means that transmits information indicating the information regarding the fault repair work determined by the determination means, to the sense of augmented reality presentation apparatus, the sense of augmented reality presentation apparatus includes presentation means that synthesizes and presents computer graphics image data for providing guidance for a method of the fault repair work, with the image of the real space, based on the information regarding the fault repair work, and in the failure analysis apparatus, after the fault repair work according to the guidance presented by the sense of augmented reality presentation apparatus, if the information associated with the operational status of the repair target object is newly obtained by the obtaining means, the information regarding the fault repair work for the repair target object is newly determined by the determination means based on the information associated with the operational status, and the newly determined information regarding the fault repair work is transmitted to the sense of augmented reality presentation apparatus by the transmission means.

Advantageous Effects of Invention

According to the present invention, it is possible to provide the guidance for the optimal fault repair work to assist the work even if an unexpected fault has occurred.

BRIEF DESCRIPTION OF DRAWINGS

FIG. 1 is a diagram schematically showing a configuration of a failure analysis system according to an embodiment of the present invention.

FIG. 3 is a flowchart showing a process flow in the failure analysis apparatus.

FIG. 7 is a diagram showing an example in a state where computer graphics image data representing a fault repair completion notification is synthesized and displayed with the image of the real space on the HMD.

FIG. 8 is a diagram showing an example of rule data.

FIG. 9 is a diagram showing an example of a proficiency level determination table.

FIG. 10 is a diagram showing an example of a work content explanation table.

FIG. 11 is a diagram showing an example of a worker table.

FIG. 12 is a diagram showing an example of a work content history table.

FIG. 13 is a diagram showing an example of a required ability table.

FIG. 17 is a diagram for describing signals emitted from RFID readers.

DESCRIPTION OF EMBODIMENTS

Figure 2A:
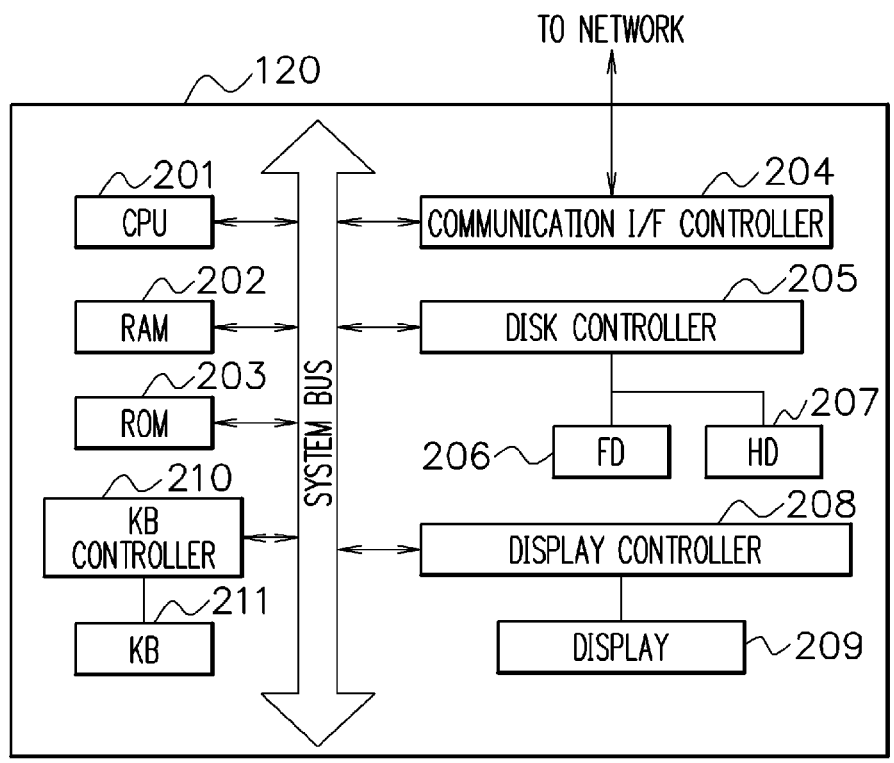
FIG. 2A is a diagram showing a hardware configuration of a failure analysis apparatus.

Hereinafter, a preferred embodiment to which the present invention is applied will be described in detail with reference to the attached drawings.

FIG. 1 is a diagram schematically showing a configuration of a failure analysis system according to an embodiment of the present invention.

As shown in FIG. 1, the failure analysis system according to the present embodiment includes a failure analysis apparatus 120 that obtains information associated with operational statuses of various servers and routers 111 to 118 and the like installed in a data center, and determines methods of fault repair work. It should be noted that the determination of the methods of the fault repair work is executed, for example, if a user has complained about unavailability of the Internet or the like, and the like. The failure analysis apparatus 120 determines the methods of the fault repair work, and then transmits information on guidance to locations of the fault repair work, and guidance information on the methods of the fault repair work, to glasses-type HMDs (Head Mounted Displays) 101 and 104 mounted on the heads of workers y and x, via wireless communication lines. The HMDs 101 and 104 synthesize and display computer graphics image data for guiding the workers y and x to the locations of the fault repair work, or computer graphics image data for providing the guidance for the methods of the fault repair work, with an image of real space. In other words, the HMDs 101 and 104 display the computer graphics image data at a position matching the image of the real space, which is shown on lens portions of the HMDs 101 and 104 in an optically transmissive manner, and thereby produce a sense of augmented reality. In the following description, the synthesis and display of the computer graphics image data for giving the sense of augmented reality in this way may be referred to as AR (Augmented Reality) display. It should be noted that there are various schemes of the HMD, such as a non-transmissive type, a video-transmissive type and an optically-transmissive type. The synthesis and display (AR display) is to display the computer graphics image data at the matched position in a superimposed manner on the image of the real space shown on the lens portion of the HMD according to any scheme. For example, in the scheme of the optically-transmissive type, the display is performed in a superimposed manner on the image of the real space seen through, and in the video-transmissive type, the display is performed in a superimposed manner on the image of the real space which has been taken by a video camera.

It should be noted that, in the present embodiment, the glasses-type HMD is described as an example of an AR display device that is a device for performing the AR display, which, however, is not limited thereto. For example, an AR display device of a mobile terminal type for displaying a video of the real space taken by a camera, on a liquid crystal display or the like, synthesizing and displaying the computer graphics image data with the displayed video of the real space may be employed. An AR display device of a head-up display type that is installed in an eye direction at a driver's seat in a mobile vehicle and synthesizes and displays the computer graphics image data with the image of the real space shown in an optically transmissive manner may be employed. Moreover, while the computer graphics image data is displayed so as to match the image of the real space, coordinate matching between an object in the image of the real space and the computer graphics image data is performed. As a coordinate matching approach, where in the real space a working person wearing the HMD is looking at may be estimated based on a position (latitude, longitude) and a posture (an orientation, an elevation angle) of the HMD, and the computer graphics image data may be synthesized so as to match the estimated position; or a marker may be previously attached to the object in the real space, an image of the marker may be taken by the camera, a position of this marker may be detected from taken image data, and the computer graphics image data may be synthesized so as to match the detected position. Furthermore, image data of the real space captured by the camera may be analyzed to detect a position of the object in the real space, and the computer graphics image data may be synthesized so as to match the detected position.

Moreover, miniature cameras 102 and 105 are attached to the HMDs 101 and 104 so that image data can be taken at angles of view close to fields of vision of the workers x and y. The taken image data is transmitted via the wireless communication lines to the failure analysis apparatus 120. The failure analysis apparatus 120 stores received image data into a storage device 122 once, and then analyzes the image data to detect presence of the servers and routers 111 to 118 shown in the image data, or to determine operational states of the servers and routers 111 to 118. For example, the failure analysis apparatus 120 previously registers image data of the servers and routers 111 to 118, performs matching between the taken image data and the image data of the servers and routers 111 to 118, and thereby detects the presence of the servers and routers 111 to 118. As an operational state determination method, for example, the failure analysis apparatus 120 analyzes image data of power indicator portions of the servers and routers 111 to 118. If it is possible to sense that power indicators are on, it is determined that power of the servers is on. If it is not possible to sense that the power indicators are on, it is determined that the power of the servers is off.

Moreover, the failure analysis apparatus 120 obtains log data from the servers and routers 111 to 118 installed in the data center, with a monitoring unit 121. The log data obtained herein includes a CPU usage rate, a memory usage rate, a power-supply voltage, a temperature, a communication speed, the number of accesses and the like. The log data obtained by the monitoring unit 121 is retained in the storage device 122. Moreover, past fault handling data indicating countermeasures actually performed during occurrence of faults in the past, and rule data indicating a handling rule during occurrence of predefined faults are accumulated in the storage device 122. For example, if there is the complaint about the unavailability of the Internet or the like, an instruction content generation unit 123 analyzes latest log data and image data to thereby recognize the operational statuses of the corresponding servers and routers, and also obtains the rule data and the past fault handling data that are related to a fault having occurred, from the storage device 122 to determine the methods of the fault repair work.

When the methods of the fault repair work are determined, the failure analysis apparatus 120 obtains map data including positions of current locations of the HMDs 101 and 104 (the workers y and x wearing the HMDs 101 and 104) and the locations of the fault repair work, and generates guidance information for providing guidance for routes from the current locations to the locations of the fault repair work. The generated guidance information is transmitted to the HMDs 101 and 104, and the HMDs 101 and 104 synthesize and AR-display computer graphics image data for providing the guidance for the routes from the current locations to the locations of the fault repair work, with the image of the real space. It should be noted that the failure analysis apparatus 120 may use a GPS (Global Positioning system) to obtain the current locations of the HMDs 101 and 104.

When the workers y and x arrive at the locations of the fault repair work according to the guidance, the instruction content generation unit 123 transmits the methods of the fault repair work to the HMDs 101 and 104. The HMDs 101 and 104 synthesize and AR-display the computer graphics image data for providing the guidance for the methods of the fault repair work, with the image of the real space. Thereby, the workers y and x can perform the fault repair work according to the guidance. It should be noted that the arrival of the workers at the locations of the fault repair work can be sensed by the miniature cameras 102 and 105 taking the image data of the servers and routers 111 to 118 that are targets of the fault repair work, and the instruction content generation unit 123 analyzing this image data. Moreover, the failure analysis apparatus 120 is also connected to a PC 130 of a superior z, who is remotely located from the data center, of the workers y and x via the Internet. When receiving an e-mail transmitted from the PC 130 of the superior z, at the monitoring unit 121, the failure analysis apparatus 120 analyzes content of the e-mail, and takes the analyzed content into account to determine the methods of the fault repair work.

FIG. 2A is a diagram showing a hardware configuration of the failure analysis apparatus 120 according to the present embodiment. A CPU 201 controls each of devices and controllers connected to a system bus, in an integrated manner. In a ROM 203 or an HD (hard disk) 207, a BIOS (Basic Input/Output System) that is a control program for the CPU 201, an operating system program, a program of a process, for example, as shown in FIG. 3, which is executed by the failure analysis apparatus 120, and the like are stored.

It should be noted that, while a configuration is employed in which the HD 207 is disposed within the failure analysis apparatus 120 in an example of FIG. 2A, a configuration may be employed in which a configuration corresponding to the HD 207 is disposed out of the failure analysis apparatus 120, as another embodiment. Moreover, a configuration may be employed in which the program for performing the process, for example, as shown in FIG. 3, according to present embodiment is recorded in computer-readable recording media such as a flexible disk (FD) and a CD-ROM, and supplied from the recording media, or a configuration may be employed in which the program is supplied via a communication medium such as the Internet.

A RAM 202 functions as a main memory, a work area and the like of the CPU 201. The CPU 201 loads the program and the like required for executing the process, into the RAM 202, and executes the program to realize various operations.

The HD 207 and an FD 206 function as external memories. The CPU 201 loads the program and the like required for executing the process, into the RAM 202, and executes the program to realize the various operations.

A disk controller 205 controls access to the external memories such as the HD 207 and the FD 206. A communication I/F controller 204 connects to the Internet or a LAN to control external communication, for example, according to TCP/IP.

A display controller 208 controls image display on a display 209.

A KB controller 210 accepts operation input from a KB (keyboard) 211, and transmits the operation input to the CPU 201. It should be noted that, in addition to the KB 211, a pointing device such as a mouse, although not shown, is also applicable to the failure analysis apparatus 120 according to the present embodiment, as operation means for the user.

The instruction content generation unit 123 shown in FIG. 1 is a configuration realized by a program, for example, which is stored in the HD 207 and loaded into the RAM 202 if necessary, and the CPU 201 executing the program. Moreover, the monitoring unit 121 is a configuration corresponding to the communication I/F controller 204, and the storage device 122 is a configuration corresponding to the HD 207.

Figure 2B:
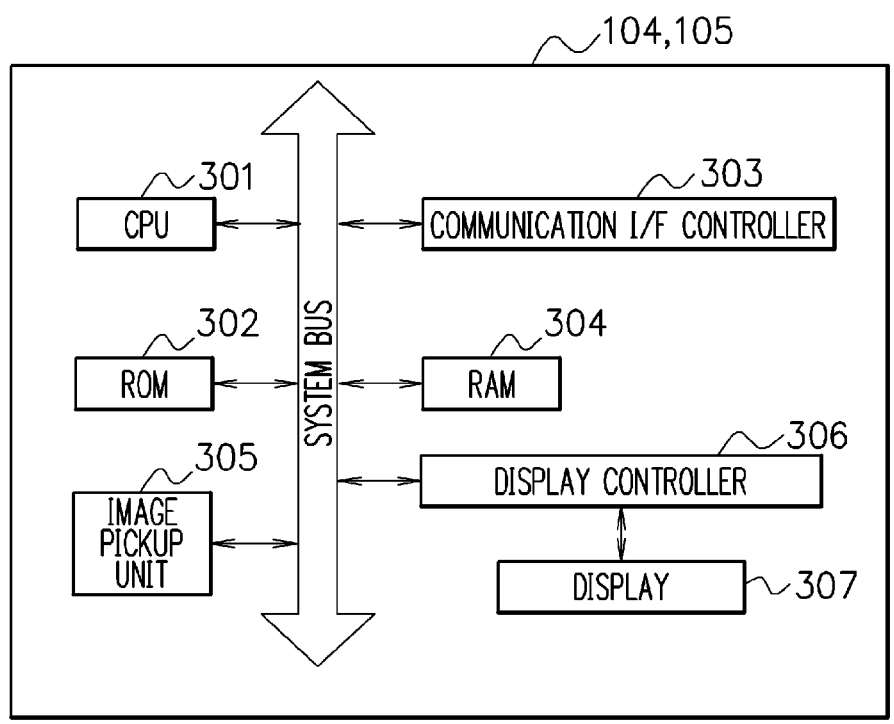
FIG. 2B is a diagram showing a hardware configuration of HMDs and miniature cameras.
Figure 4A:
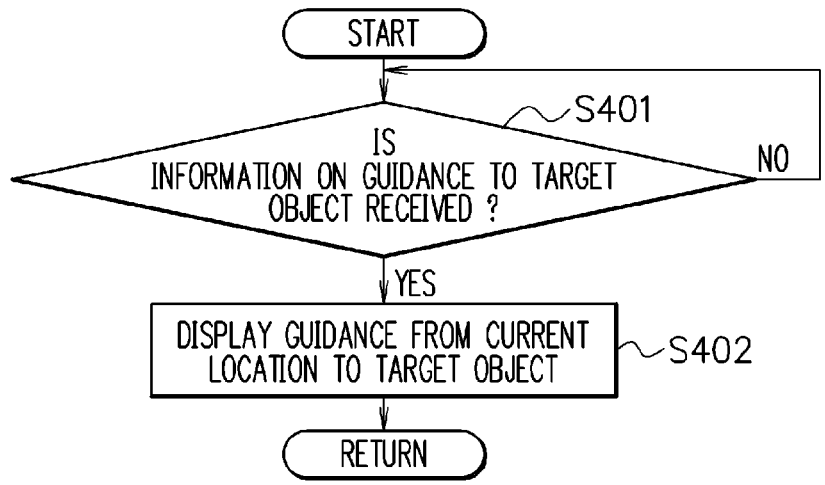
FIG. 4A is a flowchart showing a process in the HMD.
Figure 4B:
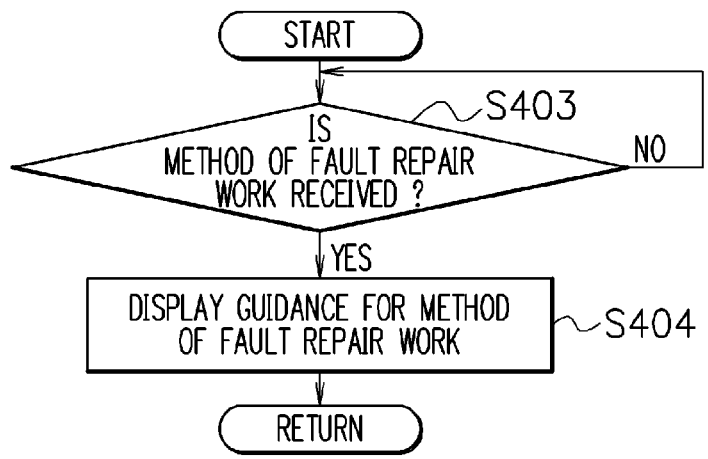
FIG. 4B is a flowchart showing a process in the HMD.
Figure 4C:
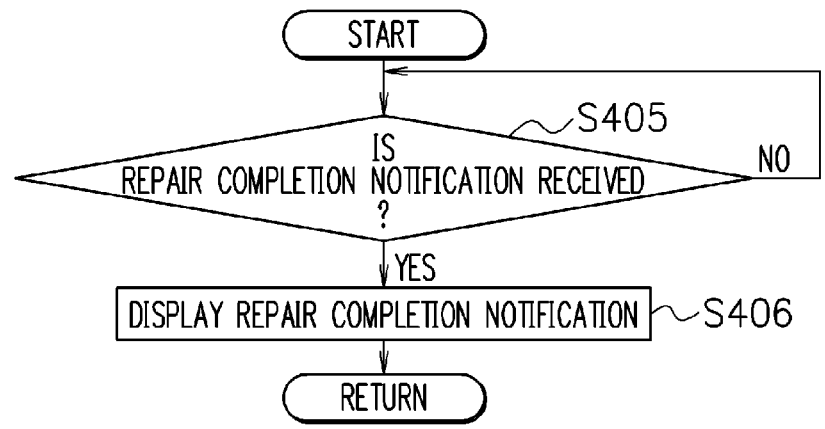
FIG. 4C is a flowchart showing a process in the HMD.

FIG. 2B is a diagram showing a hardware configuration of the HMDs 101 and 104 as well as the miniature cameras 102 and 105 according to the present embodiment. A CPU 301 controls each of devices and controllers connected to a system bus, in an integrated manner. In a ROM 302, programs of processes, for example, as shown in FIGS. 4A to 4C, which are executed by the HMDs 101 and 104, and the like are stored. It should be noted that a configuration may be employed in which the programs for performing the processes shown in FIGS. 4A to 4C are supplied via the communication medium such as the Internet.

A RAM 304 functions as a main memory, a work area and the like of the CPU 301. The CPU 301 loads the programs and the like required for executing the processes, into the RAM 304, and executes the programs to realize various operations. A communication I/F controller 303 connects to the Internet or the LAN to control the external communication, for example, according to the TCP/IP.

An image pickup unit 305 converts a subject image that is caused to enter through an optical lens and is imaged onto an image pickup device, into an electrical signal, and outputs moving image data or still image data. A display controller 306 controls image display on a display 307. In the present embodiment, the head mounted display of the optically-transmissive type is employed, and the display 307 is configured with a half mirror so that a user wearing the display 307 can see an external situation through the display 307. It should be noted that the image pickup unit 305 is a configuration corresponding to the miniature cameras 102 and 105 in FIG. 1.

FIG. 3 is a flowchart showing a process flow in the failure analysis apparatus 120 according to the present embodiment. The process shown in FIG. 3 is a process that is, for example, started by an administrator inputting content of the complaint into the failure analysis apparatus 120 if the user has complained about the unavailability of the Internet or the like.

In step S301, the instruction content generation unit 123 obtains the latest log data and image data, as well as necessary rule data and past fault handling data, from the storage device 122. The log data and the image data stored in the storage device 122 are obtained by the monitoring unit 121. The monitoring unit 121 may obtain the log data at a timing when the log data is updated in each of the servers and routers 111 to 118, or may obtain the log data at a periodic timing. Moreover, the monitoring unit 121 obtains the image data at a timing when the miniature cameras 102 and 105 have taken the image data.

In step S302, the instruction content generation unit 123 determines the methods of the fault repair work based on the log data, the image data, the rule data and the past fault handling data obtained from the storage device 122, for example, by using an existing decision tree algorithm. Here, as the method of the fault repair work, "who (worker object) performs what (operation object) for which device (target object)" is determined. As a specific example, it is assumed that it has been determined that the worker x (worker object) performs restart (operation object) for the Web server a 117 (target object), and that the worker y (worker object) performs the restart (operation object) for the Web server b 112 (target object).

In step S303, the instruction content generation unit 123 determines whether or not the fault repair work has been completed. If the fault repair work has been completed, the process moves to step S307. In contrast, if the fault repair work has not been completed, the process moves to step S304. Here, since the methods of the fault repair work have been determined in immediately preceding step S302, it is determined that the fault repair work has not been completed. Accordingly, the process moves to step S304.

In step S304, the instruction content generation unit 123 obtains map data including the current locations of the HMDs 101 and 104, as well as positions of the target objects, generates guidance information for providing guidance for routes from the current location of the HMDs 101 and 104 to the target objects, and transmits the guidance information to the HMDs 101 and 104. In other words, the instruction content generation unit 123 transmits guidance information for providing guidance for a route from the current location of the worker y wearing the HMD 101 to the Web server b 112, to the HMD 101, and transmits guidance information for providing guidance for a route from the current location of the worker x wearing the HMD 104 to the Web server a 117, to the HMD 104.

In step S305, the instruction content generation unit 123 analyzes the image data obtained from the storage device 122 in step S301, and thereby determines whether or not the workers y and x wearing the HMDs 101 and 104 have arrived at the target objects, respectively. In other words, here, as a result of analyzing the image data taken by the miniature cameras 102 and 105, if image data of the Web server b 112 or the Web server a 117 occupies an area corresponding to a certain percentage or more of this image data, the instruction content generation unit 123 determines that the arrival at the target object has been performed. If the arrival at the target objects has been performed, the process moves to step S306. In contrast, if the arrival at the target objects has not been performed, the process returns to step S304.

In step S306, the instruction content generation unit 123 transmits the methods of the fault repair work to the HMDs 101 and 104. In other words, the instruction content generation unit 123 transmits the method of the fault repair work having content of "the worker y performs the restart for the Web server b 112" to the HMD 101. In contrast, the instruction content generation unit 123 transmits the method of the fault repair work having content of "the worker x performs the restart for the Web server a 117" to the HMD 104. Thereby, on the HMD 101, computer graphics image data for providing guidance for the method of the fault repair work of "the worker y performs the restart for the Web server b 112" is synthesized and displayed with the real space. Moreover, on the HMD 104, computer graphics image data for providing guidance for the method of the fault repair work of "the worker x performs the restart for the Web server a 117" is synthesized and displayed with the real space. The workers y and x perform the fault repair work according to the guidance from the computer graphics image data displayed on the HMDs 101 and 104, respectively. Due to the fault repair work, if changes appear in values of the CPU usage rate, the memory usage rate, the communication speed, the number of accesses and the like of the servers and routers 111 to 118, the log data is updated in the servers and routers 111 to 118.

After step S306, the process returns to step S301. In step S301, the instruction content generation unit 123 obtains the latest log data and image data, as well as the necessary rule data and past fault handling data, from the storage device 122 again.

In step S302, the instruction content generation unit 123 determines the methods of the fault repair work based on the log data, the image data, the rule data and the past fault handling data obtained from the storage device 122, for example, by using the existing decision tree algorithm. Here, it is assumed that it has been determined, as the methods of the fault repair work, that the worker x (worker object) performs the restart (operation object) for the proxy server c 115 (target object), and that the worker y (worker object) performs confirmation of a configuration file (operation object) for the proxy server d 111 (target object).

In step S303, the instruction content generation unit 123 determines whether or not the fault repair work has been completed. Here, since the methods of the fault repair work have been decided in immediately preceding step S302, it is determined that the fault repair work has not been completed. Accordingly, the process moves to step S304.

In step S304, according to a method similar to the above described method, the instruction content generation unit 123 generates guidance information for providing guidance for a route from the Web server b 112, which is the current location of the HMD 101, to the proxy server d 111, which is the target object, and transmits the guidance information to the HMD 101. Moreover, the instruction content generation unit 123 similarly generates guidance information for providing guidance for a route from the Web server a 117, which is the current location of the HMD 104, to the proxy server c 115, which is the target object, and transmits the guidance information to the HMD 104.

In step S305, according to a method similar to the above described method, the instruction content generation unit 123 determines whether or not the workers y and x wearing the HMDs 101 and 104 have arrived at the proxy server d 111 and the proxy server c 115, which are the target objects, respectively. When the HMDs 101 and 104 arrive at the target objects, respectively, the instruction content generation unit 123 transmits the content of the fault repair work to the HMDs 101 and 104 in step S306. In other words, the instruction content generation unit 123 transmits the method of the fault repair work having content of "the worker y performs the confirmation of the configuration file for the proxy server d 111" to the HMD 101. Moreover, the instruction content generation unit 123 transmits the method of the fault repair work having content of "the worker x performs the restart for the proxy server c 115" to the HMD 104. Thereby, on the HMD 101, computer graphics image data for providing guidance for the method of the fault repair work of "the worker y performs the confirmation of the configuration file for the proxy server d 111" is synthesized and displayed. Moreover, on the HMD 104, computer graphics image data for providing guidance for the method of the fault repair work of "the worker x performs the restart for the proxy server c 115" is displayed. The workers y and x perform the fault repair work according to the guidance from the computer graphics image data displayed on the HMDs 101 and 104, respectively. The log data is updated due to this fault repair work.

Incidentally, it is assumed that the superior z of the workers y and x has remembered that a hardware failure has occurred in the router e 116 and has been handled on a previous day, and the superior z has transmitted an e-mail describing "a hardware failure has occurred in the router e 116 and has been handled on a previous day" to a mail address of the worker x. This e-mail is obtained by the monitoring unit 121 in step S301. The obtained e-mail is stored in the storage device 122.

After step S306, the process returns to step S301. In step S301, the instruction content generation unit 123 obtains the above e-mail, in addition to the latest log data and image data, as well as the necessary rule data and past fault handling data, from the storage device 122.

In step S302, the instruction content generation unit 123 determines the methods of the fault repair work based on the above e-mail, in addition to the log data, the image data, the rule data and the past fault handling data obtained from the storage device 122, for example, by using the existing decision tree algorithm. Here, it is assumed that analyzed content of the e-mail has been particularly reflected, and that it has been determined, as the method of the fault repair work, that the worker x (worker object) performs confirmation of information in a routing table (operation object), for the router e 116 (target object).

In step S303, the instruction content generation unit 123 determines whether or not the fault repair work has been completed. Here, since the method of the fault repair work has been decided in immediately preceding step S302, it is determined that the fault repair work has not been completed. Accordingly, the process moves to step S304.

In step S304, according to a method similar to the above described method, the instruction content generation unit 123 generates guidance information for providing guidance for a route from the proxy server c 115, which is the current location of the HMD 104, to the router e 116, which is the target object, and transmits the guidance information to the HMD 104. It should be noted that the guidance information for the HMD 101 is not generated because the target object in the fault repair work for the worker x wearing the HMD 101 is not changed.

In step S305, according to a method similar to the above described method, the instruction content generation unit 123 determines whether or not the worker x wearing the HMD 104 has arrived at the router e 116 that is the target object. If it is determined that the worker x wearing the HMD 104 has arrived at the router e 116 that is the target object, the instruction content generation unit 123 transmits the content of the fault repair work to the HMD 104 in step S306. In other words, the instruction content generation unit 123 transmits the method of the fault repair work having content of "the worker x performs the confirmation of the information in the routing table, for the router e 116" to the HMD 104. Thereby, on the HMD 104, computer graphics image data for providing guidance for the method of the fault repair work of "the worker x performs the confirmation of the information in the routing table, for the router e 116" is synthesized and displayed.

Incidentally, it is assumed that the worker x has confirmed the information in the routing table according to the guidance for the method of the fault repair work, and confirmed that the information in the routing table has not been changed, although the information in the routing table should have been changed by handling the hardware failure. The worker x takes an image of the display on which the information in the routing table is displayed, with the miniature camera 105, and transmits the information in the routing table as image data to the failure analysis apparatus 120. When receiving the image data including the information in the routing table, the failure analysis apparatus 120 stores the image data into the storage device 122.

After step S306, the process returns to step S301. In step S301, the instruction content generation unit 123 obtains the latest log data and image data, as well as the necessary rule data and past fault handling data, from the storage device 122 again.

In step S302, the instruction content generation unit 123 determines the methods of the fault repair work based on the log data, the image data, the rule data and the past fault handling data obtained from the storage device 122, for example, by using the existing decision tree algorithm. Here, it is assumed that, through analysis of the image data, it is sensed that the information in the routing table has not been changed, although the information in the routing table should have been changed, and it is assumed that it has been determined, as the method of the fault repair work, that the worker x (worker object) performs the change of the information in the routing table (operation object), for the router e 116 (target object).

In step S303, the instruction content generation unit 123 determines whether or not the fault repair work has been completed. Here, since the method of the fault repair work has been decided in immediately preceding step S302, it is determined that the fault repair work has not been completed. Accordingly, the process moves to step S304.

The target objects in the fault repair work for the workers y and x wearing the HMDs 101 and 104 are not changed. Accordingly, in step S304, the instruction content generation unit 123 does not generate the guidance information for the HMDs 101 and 104.

In step S305, the instruction content generation unit 123 determines that both the workers y and x wearing the HMDs 101 and 104 have arrived at the target objects. Accordingly, the process moves to step S306.

In step S306, the instruction content generation unit 123 transmits the content of the fault repair work to the HMD 104. In other words, the instruction content generation unit 123 transmits the method of the fault repair work of "the worker x performs the change of the information in the routing table, for the router e 116" to the HMD 104. Thereby, on the HMD 104, computer graphics image data for providing guidance for the method of the fault repair work of "the worker x performs the change of the information in the routing table, for the router e 116" is synthesized and displayed.

When the worker x performs the repair work according to the guidance from the computer graphics image data, the log data in the servers and routers 111 to 118 is updated, and the image data taken by the miniature camera 105 is also updated, such as changes in lighting states of indicators of the servers and routers. The log data and image data updated in this way are stored in the storage device 122 of the failure analysis apparatus 120.

After step S306, the process returns to step S301. In step S301, the instruction content generation unit 123 obtains the latest log data and image data, as well as the necessary rule data and past fault handling data, from the storage device 122 again.

In step S302, the instruction content generation unit 123 determines the methods of the fault repair work based on the log data, the image data, the rule data and the past fault handling data obtained from the storage device 122, for example, by using the existing decision tree algorithm. Here, the instruction content generation unit 123 determines that there is no fault, by sensing that, for example, the CPU usage rate has been reduced, the communication speed has improved, or the like, as a result of analyzing the log data, or by sensing that, for example, a failure indicator has been turned off, or the like, as a result of analyzing the image data. Then, the determination of the methods of the fault repair work is not performed. Accordingly, in step S303, it is determined that fault repair has been completed, and the process moves to step S307.

In step S307, the instruction content generation unit 123 transmits fault repair completion notifications to the HMDs 101 and 104. Thereby, for example, computer graphics image data having content of "full repair at ∘∘ o'clock, ∘∘ minutes" is synthesized and displayed on the HMDs 101 and 104. The workers y and x finish the fault repair work. It should be noted that the process shown in FIG. 3 may be started if performance information on various devices in the data center exceeds predefined thresholds, in addition to the input to the failure analysis apparatus by the administrator.

FIGS. 4A to 4C are flowcharts showing processes in the HMDs 101 and 104. More specifically, FIG. 4A shows a process in which the HMDs 101 and 104 display the computer graphics image data for providing the guidance for the routes from the current locations to the target objects of the fault repair work. FIG. 4B shows a process in which the HMDs 101 and 104 display the computer graphics image data for providing the guidance for the methods of the fault repair work. FIG. 4C shows a process in which the HMDs 101 and 104 display the fault repair completion notifications. It should be noted that the respective processes shown in FIGS. 4A to 4C are performed by the CPU 301 reading necessary programs from the ROM 302 and executing the programs.

The process in which the HMDs 101 and 104 display the computer graphics image data for providing the guidance for the routes from the current locations to the target objects of the fault repair work will be first described with reference to FIG. 4A. In step S401, the HMDs 101 and 104 determine whether or not the guidance information for providing the guidance for the routes from the current locations to the target objects of the fault repair work has been received from the failure analysis apparatus 120. If the guidance information has been received, the process moves to step S402. If the guidance information has not been received, the process returns to step S401, and the determination of the reception of the guidance information is performed again. In step S402, the HMDs 101 and 104 synthesize the computer graphics image data for providing the guidance for the routes from the current locations to the target objects of the fault repair work, with the image of the real space in a superimposed manner, and AR-display them. Thereby, the guidance for the routes from the current locations to the target objects of the fault repair work is provided to the workers y and x.

Figure 5:
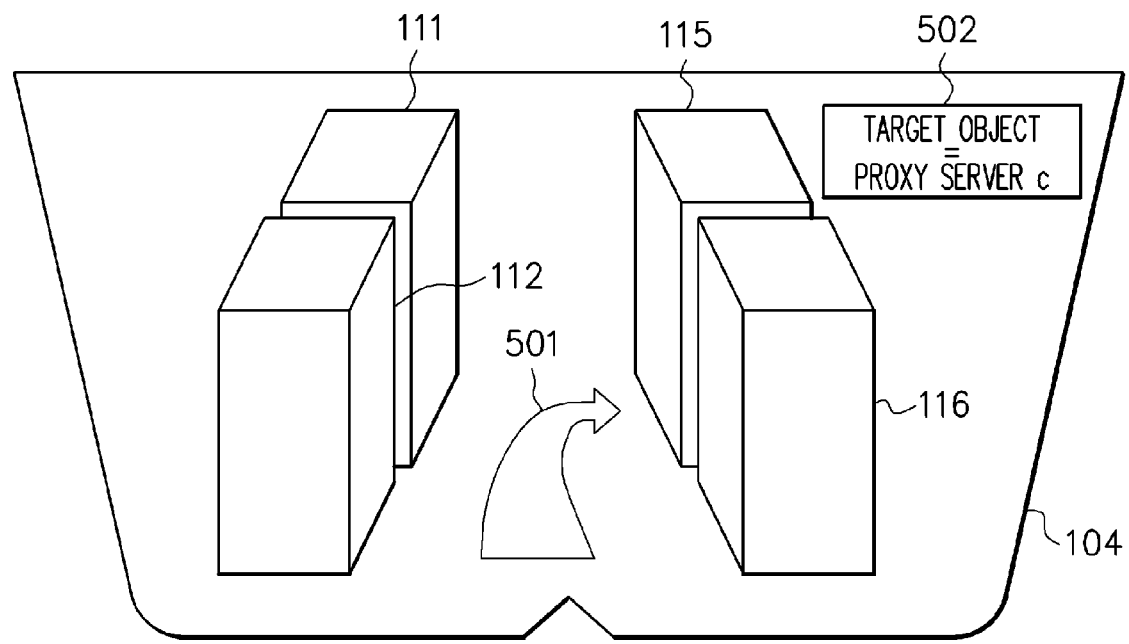
FIG. 5 is a diagram showing an example in a state where computer graphics image data for providing guidance for a route from a current location to a proxy server c, which is a target object of fault repair work, is synthesized and displayed with an image of real space on the HMD.

FIG. 5 is a diagram showing an example in a state where the computer graphics image data for providing the guidance for the route from the current location to the proxy server c 115, which is the target object of the fault repair work, is synthesized and displayed with the image of the real space on the HMD 104. In FIG. 5, the proxy server d 111, the Web server b 112, the proxy server c 115 and the router e 116 are the image of the real space. Reference numeral 501 denotes the computer graphics image data for providing the guidance for the route from the current location to the proxy server c 115, which is the target object of the fault repair work, and is synthesized and displayed in a state of being coordinate-matched with the image of the real space. It should be noted that reference numeral 502 denotes computer graphics image data clearly indicating that the target object, which is a destination for the guidance of the route, is the proxy server c 115, and is synthesized and displayed at a predetermined position in the video shown on the HMD 104.

Next, the process in which the HMDs 101 and 104 synthesize and display the computer graphics image data for providing the guidance for the methods of the fault repair work will be described with reference to FIG. 4B. In step S403, the HMDs 101 and 104 determine whether or not the methods of the fault repair work have been received from the failure analysis apparatus 120. If the methods of the fault repair work have been received, the process moves to step S404. In contrast, if the methods of the fault repair work have not been received, the process returns to step S403, and the determination of the reception of the methods of the fault repair work is performed again. In step S404, the HMDs 101 and 104 synthesize and display the computer graphics image data for providing the guidance for the methods of the fault repair work, with respect to the image of the real space. Thereby, the guidance for the methods of the fault repair work is provided to the workers y and x.

Figure 6:
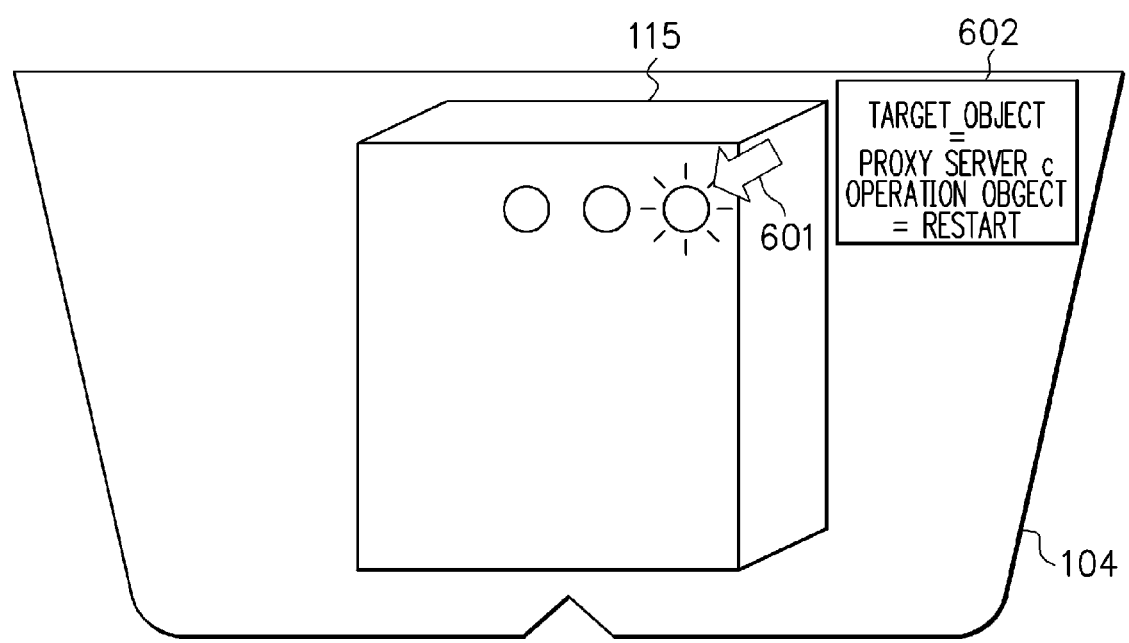
FIG. 6 is a diagram showing an example in a state where computer graphics image data for providing guidance for a method of the fault repair work is synthesized and displayed with the image of the real space on the HMD.

FIG. 6 is a diagram showing an example in a state where the computer graphics image data for providing the guidance for the method of the fault repair work is synthesized and displayed with the image of the real space on the HMD 104. In FIG. 6, the proxy server c 115 is the image of the real space. Since the operation object of the fault repair work is the restart, computer graphics image data 601 pointing to a restart button is coordinate-matched with a position of the restart button, and is synthesized and displayed. It should be noted that reference numeral 602 denotes computer graphics image data clearly indicating that the target object of the fault repair work is the proxy server c 115, and that the operation object is the restart, and is synthesized and displayed at a predetermined position in the video shown on the HMD 104.

Next, the process in which the HMDs 101 and 104 synthesize and display the fault repair completion notifications will be described with reference to FIG. 4C. In step S405, the HMDs 101 and 104 determine whether or not the fault repair completion notifications have been received from the failure analysis apparatus 120. If the fault repair completion notifications have been received, the process moves to step S406. In contrast, if the fault repair completion notifications have not been received, the process returns to step S405, and the determination of the reception of the fault repair completion notifications is performed again. In step S406, the HMDs 101 and 104 synthesize and display computer graphics image data representing the fault repair completion notifications, with respect to the image of the real space. Thereby, the workers y and x are notified of the completion of the fault repair work.

FIG. 7 is a diagram showing an example in a state where the computer graphics image data representing the fault repair completion notification is synthesized and displayed with the image of the real space on the HMD 104. In FIG. 7, the router e 116 is the image of the real space. Reference numeral 701 denotes computer graphics image data for notifying of the completion of the fault repair work, and is synthesized and displayed at a predetermined position in the video shown on the HMD 104.

As described above, in the present embodiment, when the complaint occurs, information regarding the fault repair work corresponding to the fault having occurred is presented to the worker. While the worker proceeds with the work according to the presented information regarding the fault repair work, such as the method of the fault repair work and a fault occurrence location, an operational state of the system is changed by the work. If the operational state of the system changes, the information regarding the fault repair work including the method of the fault repair work and the like corresponding to the changed operational state of the system is newly obtained and presented to the working person. By repeatedly executing such a process, it is possible to provide guidance for optimal fault repair work to assist fault analysis work even if an unexpected fault has occurred.

Moreover, in the above described embodiment, the case where the worker has proceeded with the work according to the method of the fault repair work presented by the failure analysis apparatus has been described. However, even if the worker has proceeded with the work according to a method different from the presented method of the fault repair work, based on the worker's own experiences, the failure analysis apparatus can obtain the log data and the image data each time to obtain the method of the fault repair work depending on the operational state of the system at that time point.

Moreover, an example for determining the method of the fault repair work by the instruction content generation unit 123, which is an example without using the existing decision tree algorithm, will be described below using FIG. 8.

FIG. 8 is a diagram showing an example of the rule data. The rule data shown in FIG. 8 shows priority weighting of the fault repair work for each check item. It should be noted that, in the example shown in FIG. 8, the weighting is represented by numerical values from "0" to "10," and larger numerical values indicate higher priority.

For example, for a check item "Is there no Ping response?," if there is no Ping response, it is indicated that fault repair work 1 having a weight set to "10" is work with the highest priority, and it is indicated that fault repair work 3 having a weight set to "0" is work that does not need to be performed.

The instruction content generation unit 123 determines whether or not there is correspondence to each check item in the rule data shown in FIG. 8, from information representing an operational status of a computer system (such as various log data, a CPU usage rate, a memory usage rate, a communication speed, or a result of executing a command). Then, the instruction content generation unit 123 calculates a total value of the weights of the check items determined to correspond to the operational status of the computer system in a current situation, for each piece of the fault repair work, and instructs the worker about a piece of the fault repair work having the largest calculated total value.

It should be noted that, while the example of adding up the weights of the corresponding check items for each piece of the fault repair work has been described in the above described example, the weights in the rule data may be used to use various evaluation formulas for enabling evaluation of the priority of the fault repair work, without any particular limitation.

Moreover, while the example of selecting only one piece of the work has been described in the above described example, a configuration may be employed in which a plurality of pieces of the work are sequentially executed in descending order of priority, without any particular limitation.

Furthermore, as the failure analysis system according to another embodiment of the present invention, a configuration may be employed in which a proficiency level of the worker is determined based on a result of executing the work by the worker, and instruction content for the fault repair work is changed depending on the determined proficiency level of the worker.

For example, the instruction content generation unit 123 transmits information for providing an instruction about the fault repair work to the worker, then measures a time from start of the work to the completion of the work by the worker, and determines the proficiency level of the worker, for example, based on the measured time. In this case, a proficiency level determination table, in which a correspondence relationship between a working time and the proficiency level has been defined, has been previously stored in the storage device 122. FIG. 9 is a diagram showing an example of the proficiency level determination table. An example of a proficiency level determination table 1 shown in FIG. 9 shows that, for work 1, the proficiency level is determined to be A (a highest rank) with the working time of less than five minutes, the proficiency level is determined to be B with five minutes or more and less than ten minutes, and the proficiency level is determined to be C (a lowest rank) with ten minutes or more.

Alternatively, a configuration may be employed in which the instruction content generation unit 123 transmits the information for providing the instruction about the fault repair work to the worker, then determines whether or not the work performed by the worker has been correctly performed, and determines the proficiency level of the worker based on a percentage of the correct performance of the work (work success rate). In this case, a proficiency level determination table, in which a correspondence relationship between a degree of the correct performance of the work and the proficiency level has been defined, has been previously stored in the storage device 122. An example of a proficiency level determination table 2 shown in FIG. 9 shows that, for the work 1, it is determined to be A with the success rate of 90% or more, it is determined to be B with the success rate of 70% or more and less than 90%, and it is determined to be C with the success rate of less than 70%.

It should be noted that the percentage of the correct performance of the work (work success rate) may be, for example, a percentage of the number of items for which the work has been correctly performed, in the number of all work items, or may be calculated by performing weighting depending on difficulty levels of the work and then using a predefined evaluation formula, without any particular limitation.

Furthermore, the instruction content generation unit 123 decides the information on the fault repair work to be transmitted to the worker next time, depending on a result of determining the proficiency level of the worker. For example, even if a new worker and a veteran worker perform the same work, technical terminology and the like may not get through to new and part-time workers, and basic matters should be explained in detail to the new and part-time workers, whereas, on the contrary, the detailed explanation of the basic matters reduces working efficiency for the veteran worker, and thus it is preferred to use the technical terminology to provide the instruction to the veteran worker.

Consequently, for example, the instruction content generation unit 123 transmits information representing the method of the fault repair work including a detailed explanation of work content represented without the use of the technical terminology, to the new worker. Thereby, the HMD worn by the new worker synthesizes and AR-displays the computer graphics image data for providing the guidance for the method of the fault repair work including the detailed explanation of the work content, with the image of the real space.

Moreover, the instruction content generation unit 123 transmits information representing the method of the fault repair work including a brief explanation of the work content represented with the use of the technical terminology, to the veteran worker. Thereby, the HMD worn by the veteran worker synthesizes and AR-displays the computer graphics image data for providing the guidance for the method of the fault repair work including the brief explanation of the work content with the use of the technical terminology, with the image of the real space.

In this case, a work content explanation table, in which different explanations of the work content (such as the brief explanation with the use of the technical terminology, and the detailed explanation without the use of the technical terminology) have been stored corresponding to a plurality of proficiency levels, respectively, for one piece of the fault repair work, needs to be previously stored in the storage device 122. Then, when determining the proficiency level of the worker, the instruction content generation unit 123 reads the explanation of the work content corresponding to the determined proficiency level, from the work content explanation table, and transmits the read explanation to each worker.

FIG. 10 is a diagram showing an example of the work content explanation table. In the example shown in FIG. 10, for example, the instruction content generation unit 123 transmits content of a description X to the worker determined to have the proficiency level A for the work 1.

According to the above configuration, if the AR is used to provide an interactive work instruction, while the fault repair work is repeatedly performed depending on the work result, an explanation of the work instruction at a different level is transmitted to each worker depending on previous pieces of work content of the worker. Thereby, the work instruction can be appropriately provided depending on the proficiency level of the user, and thus the fault repair work can be efficiently performed.

While the configuration for providing the different level of the explanation for each worker has been described above, in addition, for example, different ranges of disclosure of a manual to be AR-displayed may be provided. For example, it is not preferable to disclose too much information to the new workers and the part-time workers with low proficiency levels, also in terms of security. Accordingly, only a minimum necessary range may be disclosed to the new workers and the part-time workers with the low proficiency levels, while the entire content of the manual may be disclosed to workers at management post levels with high proficiency levels.

It should be noted that such a configuration in consideration of security may be a configuration for determination based on post data, access authority or the like of the worker, which has been previously registered in a worker table or the like, in addition to the above described configuration for the determination based on the proficiency level of the worker.

Moreover, as the failure analysis system according to another embodiment of the present invention, a worker who will perform the fault repair work may be decided depending on the proficiency level of the worker.

For example, it is dangerous to provide an instruction about important work in which a mistake in the work can cause a critical fault. Thus, for such important work, it is preferable to instruct a worker who steadily performs the work, rather than a worker making many mistakes in the work.

In this case, similarly to the above described configuration, for the content of the fault repair work performed by each worker, the instruction content generation unit 123 uses the proficiency level determination table to determine the proficiency level of each worker, and writes the proficiency level of each worker as a result of the determination, into the worker table. FIG. 11 is a diagram showing an example of the worker table. In the example shown in FIG. 11, for the worker X, the proficiency level for the work 1 is determined to be A rank, and the proficiency level for work 2 is determined to be B rank.

It should be noted that, for the determination of the proficiency level of each worker for writing the proficiency level for each piece of the work into the worker table, a configuration may be employed in which the proficiency level determination table is used with respect to work content of previous fault repair work to determine the proficiency level of each worker. Alternatively, a work content history (the working time and the degree of the correct performance of the work) of past fault repair work may be previously stored in a work content history table, and the proficiency level determination table may be used to determine the proficiency level with an average value of each value in the work content history. Moreover, a worker having no work content history may be determined to have a lowest proficiency level, without any particular limitation. FIG. 12 is a diagram showing an example of the work content history table. For example, the example shown in FIG. 12 shows that a worker with a worker ID of 001 (that is, the worker X) has performed the work for the working time of three minutes on Mar. 1, 20XX, at the work success rate of 85%.

Moreover, a required ability table defining an ability level of the worker required for taking charge of each piece of the fault repair work is previously stored in the storage device 122. FIG. 13 is a diagram showing an example of the required ability table. For example, the example shown in FIG. 13 shows that a minimum ability level required for a worker who performs the work 1 is C rank.

Thereby, the instruction content generation unit 123 decides the content of the fault repair work based on a current operational status of the computer system, and then reads the proficiency level required for taking charge of the decided fault repair work, from the required ability table. Then, the instruction content generation unit 123 reads ability level data of each worker stored in the worker table, decides a worker having the ability level required for taking charge of the fault repair work from now, and transmits the information representing the method of the fault repair work to the decided worker.

It should be noted that, for example, the ability level data stored in the worker table may be decided based on an average value of the proficiency levels for the respective pieces of the work, or may be decided by other evaluation formulas, as long as it is a value representing an overall ability level of each worker. Moreover, this ability level may be updated by the instruction content generation unit 123 each time each piece of the fault repair work is executed by the worker.

Moreover, if there are a plurality of workers having the required ability level, it may be determined whether or not there is the same work as this time or work similar to this time in the fault repair work that each worker has taken charge of in the past, and a worker having an experience of the same work or the similar work may be given priority for taking charge of the work. In this case, past work performance is previously stored in the worker table, and the instruction content generation unit 123 reads the past work performance from the worker table to determine whether or not there is the experience of the same work as this time or the work similar to this time. Alternatively, another priority rule (in ascending order of the number of times of work, or the like) may be predefined, or a configuration for causing the user to perform manual selection may be employed, without any particular limitation.

According to the above configuration, if the AR is used to provide the interactive work instruction, while the fault repair work is repeatedly performed depending on the work result, the worker is decided depending on the previous pieces of the work content of the worker. Thereby, an appropriate worker can be decided as a person in charge, depending on the difficulty level of the fault repair work.

Incidentally, if the worker has received an instruction to confirm a possibility of a physical fault related to a network cable, as the content of the fault repair work, the worker needs to specify where under a free access floor panel, within a server rack, or within a wall surface of facilities (hereinafter, a free access floor) the network cable, which is a target of the confirmation, is laid to run.

However, an enormous number of calculators are installed in the data center or the like, and the number of cables for connecting the calculators to a network also reaches an enormous number. Thus, it is very difficult to confirm where the network cable, which is the target of the confirmation, runs among cables laid on the free access floor.

Consequently, the present invention also provides a technique for using an AR technique to enable a desired network cable to be easily found from among network cables laid on the free access floor. This technique will be described below in detail.

The failure analysis system according to an embodiment of the present invention displays, along a real network cable laid on the free access floor, a virtual image representing this network cable, on a floor panel in the real space or in a picked-up image of the floor panel, in a superimposed manner.

Figure 14:
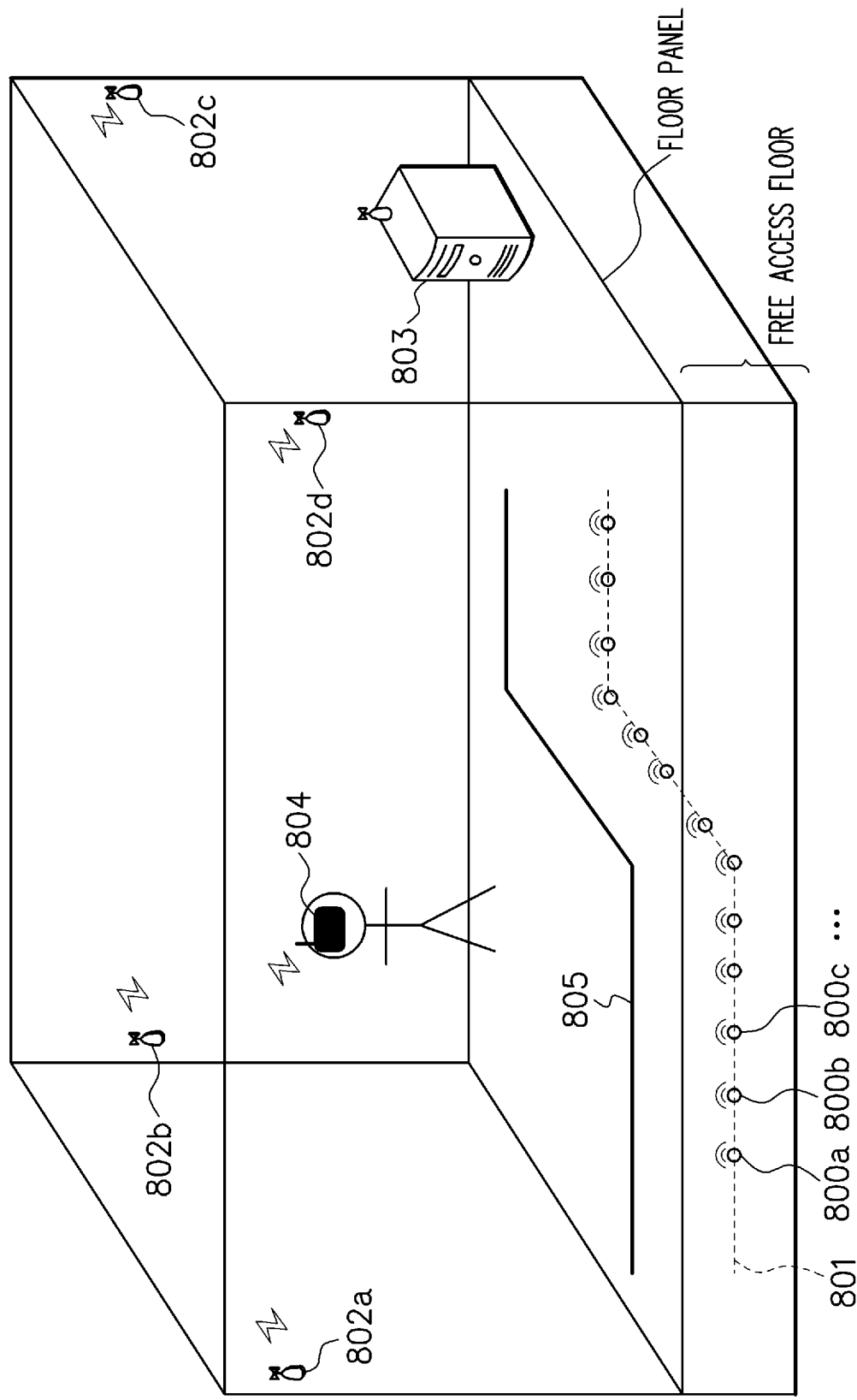
FIG. 14 is a diagram showing an example of a configuration of an information processing system.

A specific configuration for realizing the failure analysis system according to the embodiment of the present invention will be described as follows. FIG. 14 is a diagram showing an example of the configuration of the failure analysis system according to the embodiment of the present invention. As shown in FIG. 14, the failure analysis system according to the embodiment of the present invention is configured so that the system includes a network cable 801 with embedded RFIDs 800*a*, 800*b*, 800*c* . . . (hereinafter, abbreviated as "RFID 800" if they are collectively referred to), RFID readers 802*a* to 802*d*, a position management server 803, and an HMD 804. It should be noted that, while FIG. 14 shows only portions related to a technique for AR-displaying the network cable, the configuration shown in FIG. 14 is incorporated as a part of the failure analysis system shown in FIG. 1. In other words, various configurations for assisting the fault repair work are similar to the failure analysis system shown in FIG. 1, and thus a description thereof is omitted.

The network cable 801 is laid on the free access floor in the data center, and the network cable 801 is invisible due to the floor panel. Moreover, in the network cable 801, the RFID 800 is embedded at a regular interval (for example, at an interval of 1 m or the like), and each RFID stores an ID for identifying this network cable.

The RFID readers 802*a* to 802*d* receive radio waves from the RFID 800 embedded in the network cable 801.

The position management server 803 is communicably connected to the RFID readers 802*a* to 802*d* via the network, and senses a position of each RFID 800 based on information received from the RFID readers 802*a* to 802*d*. Then, the position management server 803 transmits position information representing the sensed position of the RFID 800 to the HMD 804. The position management server 803 will be described in detail later. It should be noted that, while the position management server 803 and the RFID readers 802*a* to 802*d* are connected via a wireless network in the example shown in FIG. 14, they may be connected via a wired LAN.

It should be noted that, in a hardware configuration of the position management server 803, similarly to the failure analysis apparatus 120 described using FIG. 2A, a CPU controls each of devices and controllers connected to a system bus, in an integrated manner, and programs for realizing various functions are stored in a memory or an HD, in addition to a BIOS and an OS.

The HMD 804 displays a virtual image 805 representing the network cable 801, on a floor surface in a superimposed manner along a real position of the network cable 801, based on the position information on the RFID 800 received from the position management server 803. It should be noted that the same functions as the HMD 101 and the like described using FIG. 1 are included, and a detailed description is omitted.

It should be noted that, in a hardware configuration of the HMD 804, similarly to the HMD 101 and the like described using FIG. 2B, a CPU controls each of devices and controllers connected to a system bus, in an integrated manner, and programs for realizing various functions are stored in a memory or an HD, in addition to a BIOS and an OS.

Figure 15:
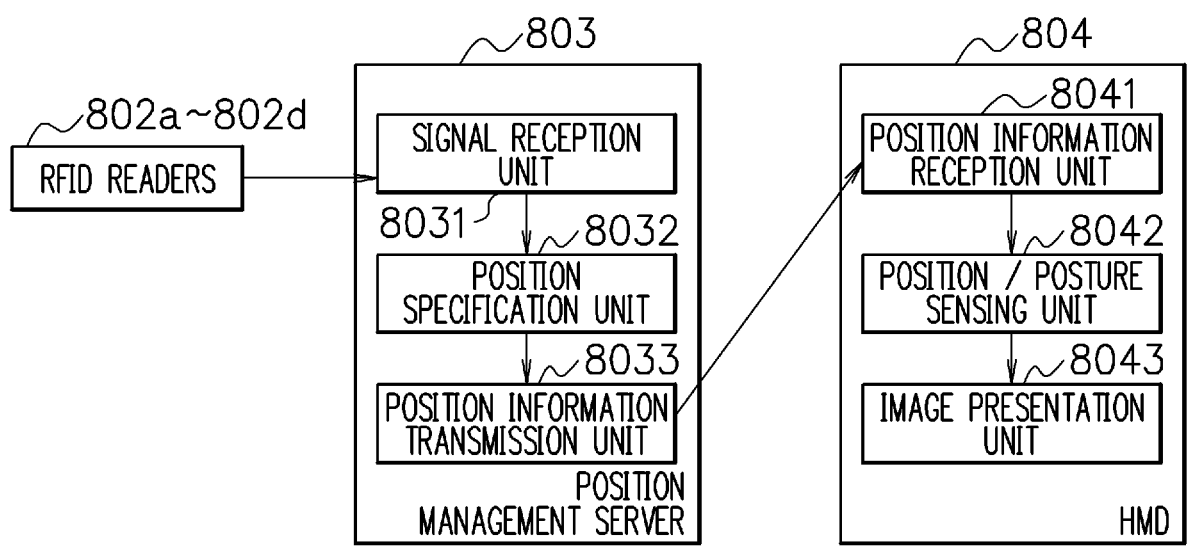
FIG. 15 is a diagram showing a functional configuration of a position management server and the HMD.

FIG. 15 is a diagram showing a functional configuration of the position management server 803 and the HMD 804. When receiving radio signals emitted from the RFID 800 provided in the network cable 801, the RFID readers 802*a* to 802*d* transmit a signal of a waveform becoming a high level at a timing of each reception, to the position management server 803. The position management server 803 is configured so that the position management server 803 includes a signal reception unit 8031, a position specification unit 8032, and a position information transmission unit 8033. The signal reception unit 8031 receives the signals emitted from the RFID readers 802*a* to 802*d*. Based on the signals received from the respective RFID readers 802*a* to 802*d* by the signal reception unit 8031, the position specification unit 8032 specifies each position of the RFID 800 (respective positions of the RFID 800*a*, the RFID 800*b*, the RFID 800*c* . . . ) provided in the network cable 801. The position information transmission unit 8033 transmits the position information indicating each position of the RFID 800 to the HMD 804.

The HMD 804 is configured so that the HMD 804 includes a position information reception unit 8041, a position/posture sensing unit 8042, and an image presentation unit 8043. The position information reception unit 8041 receives the above described position information from the position management server 803. The position/posture sensing unit 8042 senses a position (for example, latitude, longitude, or locally defined position coordinates or the like) and a posture (for example, an orientation, an elevation angle) of the HMD 804. The image presentation unit 8043 estimates where in the real space a worker wearing the HMD 804 is looking at, based on the position and the posture of the HMD 804 that have been sensed by the position/posture sensing unit 8042. Then, based on the position information on the RFID 800 received by the position information reception unit 8041, if the image presentation unit 8043 senses that the worker is looking at the floor at a location where the network cable 801 is laid on the free access floor, the image presentation unit 8043 generates the virtual image 805 representing the network cable 801, along the real position of the network cable 801 laid on the free access floor, and displays the virtual image 805 on a video of the floor surface (in the real space in the case of a transmissive-type HMD) in a superimposed manner.

Figure 16:
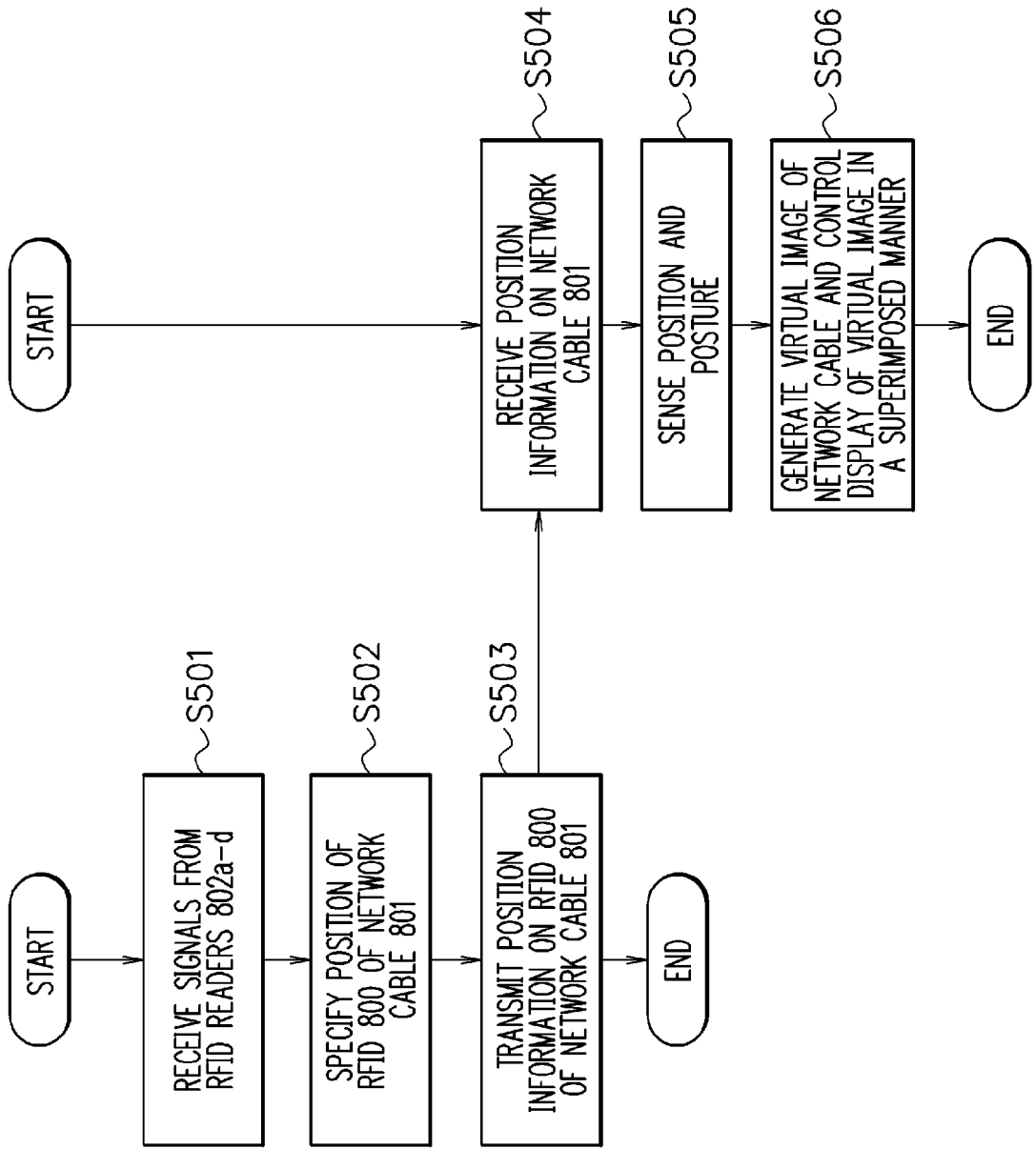
FIG. 16 is a flowchart showing a process in the information processing system.

FIG. 16 is a flowchart showing a process in the failure analysis system according to the embodiment of the present invention. In step S501, the signal reception unit 8031 receives the high level signals from all the RFID readers 802*a* to 802*d*. FIG. 17 is a diagram for describing the signals emitted from the RFID readers 802*a* to 802*d*.

It should be noted that, while a plurality of network cables are also laid on the free access floor in addition to the network cable 801, it is assumed that the worker has input an instruction to AR-display the position of the network cable 801, into the failure analysis system via an input device such as a mobile terminal in the present embodiment.

Moreover, while the network cable 801 is provided with a plurality of RFIDs such as the RFID 800*a*, the RFID 800*b*, the RFID 800*c* . . . , the RFID readers 802*a* to 802*d* receive the radio signals for all the RFIDs 800 of the network cable 801, and transmit the signal of the waveform becoming the high level at the timing of each reception, to the position management server 803.

Moreover, as a timing when each RFID 800 provided in the network cable 801 emits the radio signal, there is a configuration in which, for example, if the RFID 800 is of a passive-type, when the worker has input the instruction to AR-display the position of the network cable 801, a signal for requesting each RFID 800 to emit the ID is transmitted from any of the RFID readers 802*a* to 802*d*, and each RFID 800 emits its own ID at a shifted time in response to the request. It should be noted that the configuration for receiving the radio signals from all the RFIDs 800 provided in the network cable 801 is not necessarily required, and a configuration may be employed in which only the RFIDs disposed at a predetermined interval emit the radio signals, without any particular limitation.

An example in the case where the signal from the RFID 800*a* has been received will be described herein. When receiving the signal emitted from the RFID 800, the RFID readers 802*a* to 802*d* output the signal at the high level at the timing. In an example of FIG. 17, the RFID reader 802*a* receives the signal from the RFID 801 at time t1, and outputs the signal at the high level at the same time t1. Moreover, the RFID reader 802*b* receives the signal from the RFID 801 at time t2, and outputs the signal at the high level at the same time t2.

Moreover, the RFID reader 802*c* receives the signal from the RFID 801 at time t3, and outputs the high level signal at the same time t3. The RFID reader 802*d* receives the signal from the RFID 801 at time t4, and outputs the signal at the high level at the same time t4.

In this way, the RFID readers 802*a* to *d* receive the signal from the RFID 800*a*, and the signal reception unit 8031 in the position management server 803 receives the signals at the high level from all the RFID readers 802*a* to *d*. Moreover, similarly, the RFID readers 802*a* to *d* receive the signal from the RFID 800*b*, and the signal reception unit 8031 in the position management server 803 receives the signals at the high level from all the RFID readers 802*a* to *d*. This is repeated to receive the signals from all the RFIDs 800 provided in the network cable 801, and the signal reception unit 8031 in the position management server 803 receives the signals at the high level from all the RFID readers 802*a* to *d*, for all the RFIDs 800.

In step S502, the position specification unit 8032 specifies the position of each RFID 800 (that is, the respective positions of the RFID 800*a*, the RFID 800*b*, the RFID 800*c*...) based on a time difference or a phase difference in the reception of the signals at the high level from the RFID readers 802*a* to *d*. It should be noted that, as such a position specification approach, for example, a position detection approach of a TDOA (Time Difference of Arrival) scheme can be used. Alternatively, such a technique disclosed in Japanese Laid-open Patent Publication No. 2000-98019 is applicable.

In step S503, the position information transmission unit 8033 transmits the position information representing the position specified in step S502, to the HMD 804. It should be noted that the position management server 803 may store information regarding the network cable 801 (such as a connection source, a connection destination and a line speed) through previous registration performed by the worker, and may transmit the information regarding the network cable along with the position information to this HMD 804.

In step S504, the position information reception unit 8041 in the HMD 804 receives the position information and the information regarding the network cable as described above from the position management server 803. In step S505, the position/posture sensing unit 8042 senses the position and the posture of the HMD 804.

Figure 18:
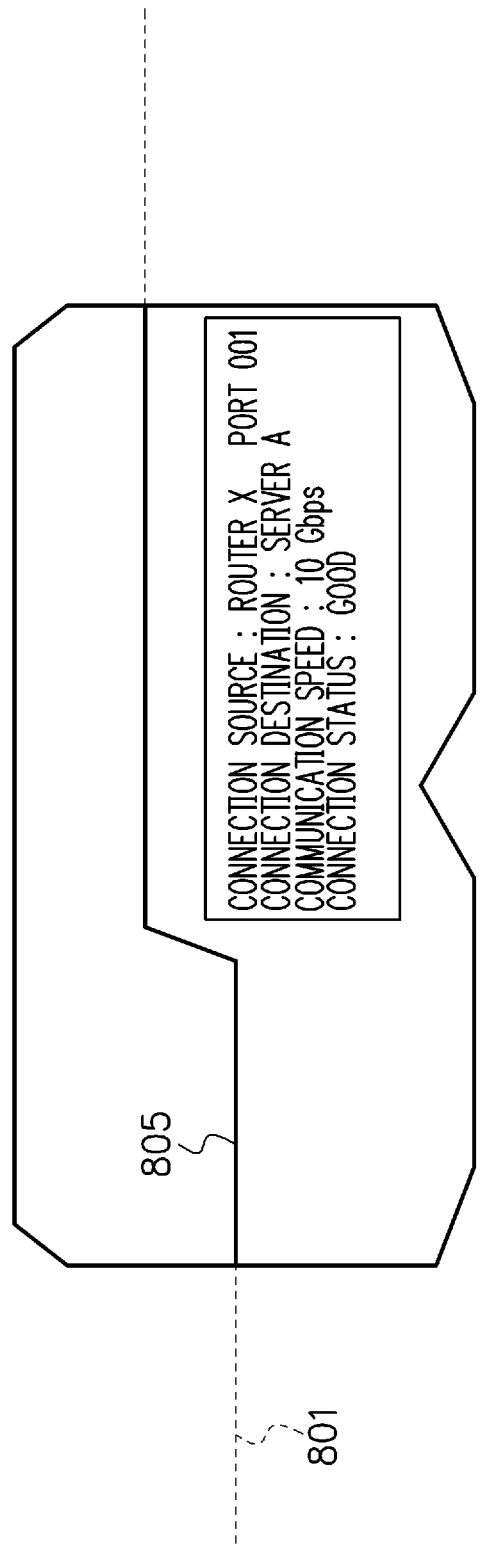
FIG. 18 is a diagram showing an example of AR-displaying a network cable laid on a free access floor, onto a floor surface.

In step S506, the image presentation unit 8043 estimates where in the real space the worker wearing the HMD 804 is looking at, based on the position and the posture of the HMD 804 that have been sensed by the position/posture sensing unit 8042. Then, based on the position information on the RFID 800 received by the position information reception unit 8041, if the image presentation unit 8043 senses that the worker is looking at the floor at the location where the network cable 801 is laid on the free access floor, the image presentation unit 8043 generates the virtual image 805 representing the network cable 801, along the real position of the network cable 801 laid on the free access floor, and displays the virtual image 805 on the video of the floor surface (in the real space in the case of the transmissive-type HMD) in a superimposed manner, as shown in FIG. 18. FIG. 18 is a diagram showing an example of AR-displaying the network cable laid on the free access floor, onto the floor surface. In the example shown in FIG. 18, the image presentation unit 8043 also presents the information regarding the network cable 801 (such as the connection source, the connection destination and the line speed), in addition to the virtual image indicating the network cable 801.

It should be noted that, in the specification of the position of the HMD 804, similarly to the specification of the position of the RFID 800, for example, an RFID is also previously provided in the HMD 804, a signal from the RFID of the HMD 804 is received by the RFID readers 802*a* to 802*d*, and the specification can be performed based on a time difference or a phase difference then. Thereby, a relative positional relationship between the HMD 804 and the RFID 800 can be specified to enable the virtual image of the network cable 801 to be AR-displayed at an appropriate position on the HMD 804.

Figure 19:
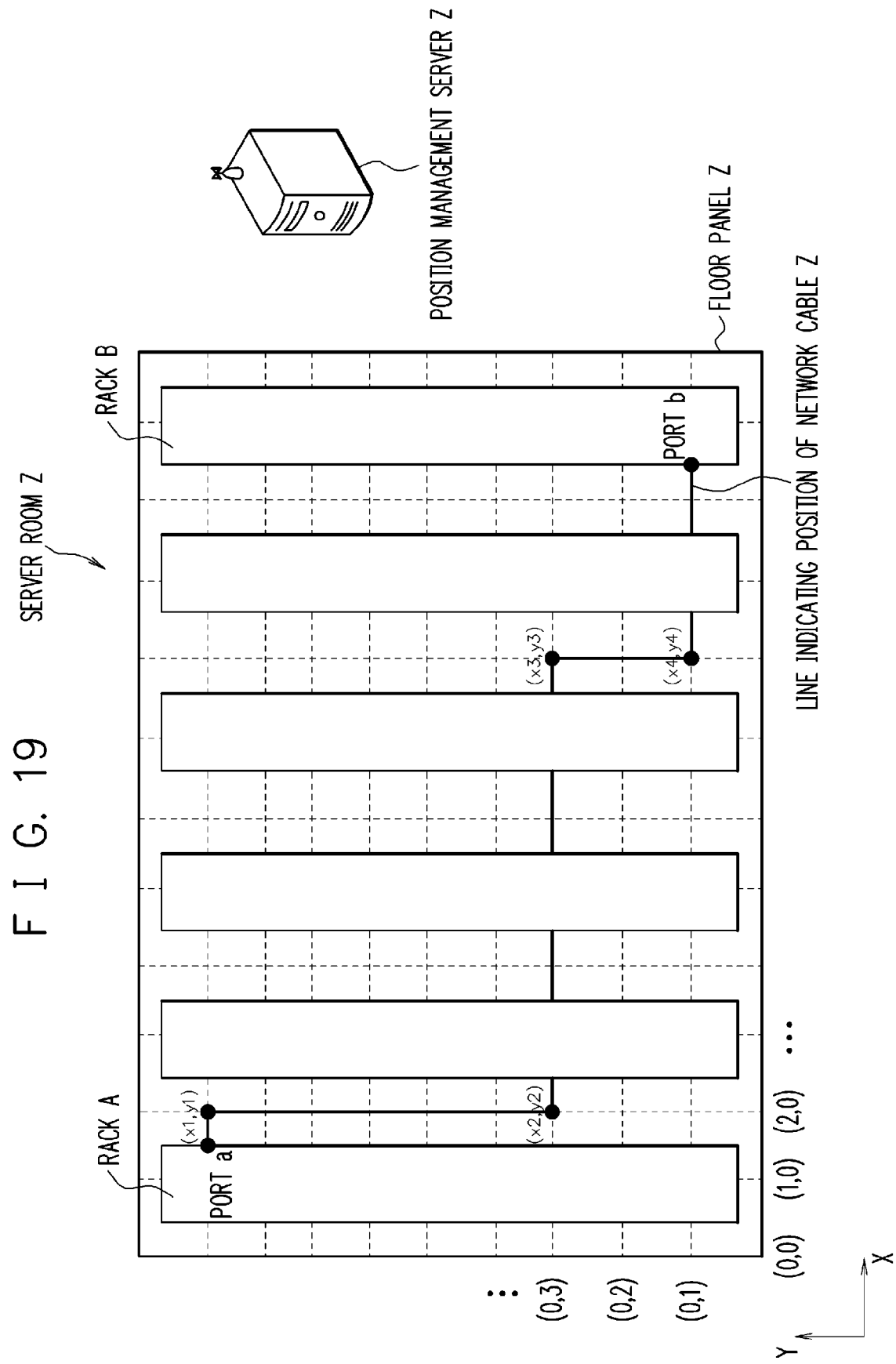
FIG. 19 is a diagram for describing an example of a configuration for specifying a position of the network cable laid on the free access floor.

Moreover, another configuration for specifying the position of the network cable will be described below. FIG. 19 is a diagram for describing an example of a configuration for specifying the position of the network cable laid on the free access floor. FIG. 19 is a plan view of a server room. In a server room Z, a plurality of racks including a rack A and a rack B are installed on a floor panel Z. Moreover, under the floor panel Z, there is the free access floor where the network cable is laid on. The network cable is, however, hidden by the floor panel Z and is usually invisible. Moreover, as shown in FIG. 19, coordinates are set on the floor panel Z, and broken lines shown on the floor panel Z are lines for indicating the coordinates.

The example shown in FIG. 19 shows an example in which a port a of a device installed in the rack A and a port b of a device installed in the rack B are connected by a network cable Z. As described above, the network cable Z is laid under the floor panel Z, and a line representing a position of the network cable Z on the floor panel Z is shown in FIG. 19. In the example shown in FIG. 19, the network cable Z is connected from the port a side, through each of coordinate positions (x1,y1), (x2,y2), (x3,y3) and (x4,y4) in order, to the port b. Information on these network ports and coordinates is registered in a position management server Z by the user. At this time, it is assumed that information representing the order in which the network cable Z runs through the respective coordinates in the case of setting any network port, to which the network cable Z is connected, as a starting point is also registered. Moreover, in this case, while at least coordinates where the direction of the laying of the network cable changes may be registered in the position management server Z, a configuration may be employed in which coordinates on the way between coordinates where the position changes are registered.

Then, as a result of the analysis by the failure analysis system, if an instruction to confirm the network cable is provided as the fault repair work, or the like, the position management server Z transmits the above information on the coordinates and the ports, as the position information on the network cable, to the HMD worn by the working person. Furthermore, if the HMD worn by the working person judges that the working person is looking through the HMD at the floor panel Z at a location where the network cable Z, which is a target of the confirmation, is laid on the free access floor, the HMD generates a virtual image representing a line connecting the above coordinates, and presents the generated virtual image in a superimposed manner on a video of the floor panel Z, to the worker.

Figure 20:
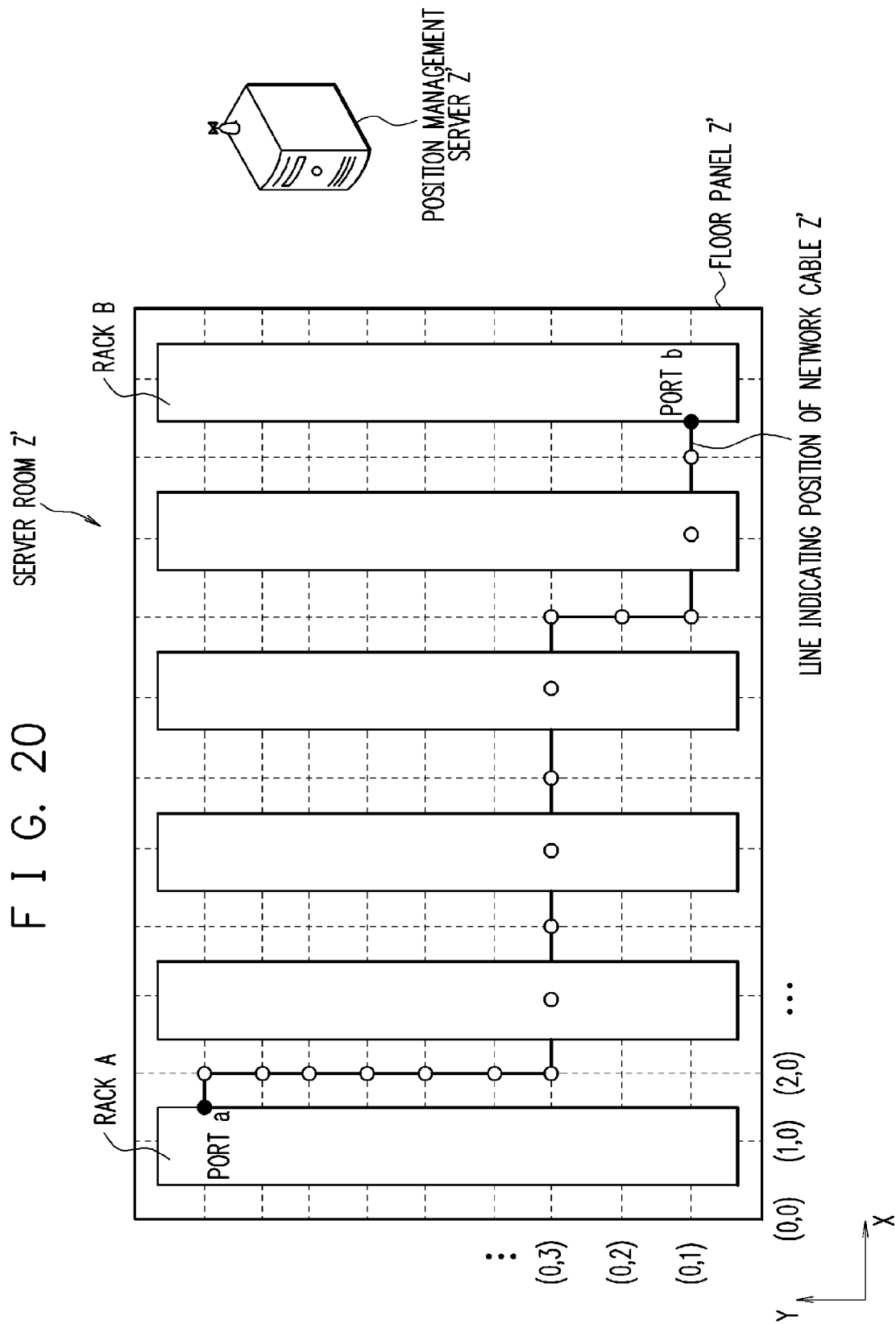
FIG. 20 is a diagram for describing an example of the configuration for specifying the position of the network cable laid on the free access floor.

FIG. 20 is a diagram for describing another example of the configuration for specifying the position of the network cable laid on the free access floor. FIG. 20 is a plan view of a server room. In a server room Z', the plurality of racks including the rack A and the rack B are installed on a floor panel Z'. Moreover, under the floor panel Z', there is the free access floor where the network cable is laid on. The network cable is, however, hidden by the floor panel Z' and is usually invisible. Moreover, as shown in FIG. 20, coordinates are set on the floor panel Z', and broken lines shown on the floor panel Z' are lines for indicating the coordinates.

The example shown in FIG. 20 shows an example in which the port a of the device installed in the rack A and the port b of the device installed in the rack B are connected by a network cable Z'. As described above, the network cable Z' is laid under the floor panel Z', and a line representing a position of the network cable Z' on the floor panel Z' is shown in FIG. 20.

In the example shown in FIG. 20, unlike the example shown in FIG. 19, the network cable Z' is provided with RFIDs at a predetermined interval. An ID for identifying the network cable Z' from other network cables is stored in each RFID embedded in this network cable Z'. Moreover, in FIG. 20, RFID readers are provided at points of intersection of the broken lines on the floor panel Z'. This RFID reader is communicable with a position management server Z'.

The RFID readers provided at the points of intersection of the broken lines on the floor panel Z' read signals emitted by the RFIDs provided in the network cable, and transmit the signals to the position management server Z'. At this time, in addition to signals representing the ID of the network cable Z', which are emitted by the RFIDs, each RFID reader also transmits strengths of the read signals to the position management server Z'.

The position management server Z' specifies the coordinates of the RFID readers that have read signals with a certain strength or more among the signals from the RFIDs embedded in the network cable Z', based on the signals and the signal strengths received from the RFID readers. In other words, the RFID readers that have received the signals with the certain strength or more represent that the network cable Z' runs near them, and thus mean that the network cable Z' rungs through the above coordinates specified by the position management server Z'. The example shown in FIG. 20 represents that the RFID readers provided at coordinates represented by white circles have received the signals with the certain strength. Moreover, it is assumed that the ports to which the network cable Z' is connected have been previously registered in the position management server Z' by the user.

Then, as a result of the analysis by the failure analysis system, if the instruction to confirm the network cable is provided as the fault repair work, or the like, the position management server Z' transmits the above information on the coordinates represented by the white circles and the ports, as the position information on the network cable, to the HMD worn by the working person. Furthermore, if the HMD worn by the working person judges that the working person is looking through the HMD at the floor panel Z' at a location where the network cable Z', which is a target of the confirmation, is laid on the free access floor, the HMD generates a virtual image representing a line connecting the above coordinates, and presents the generated virtual image in a superimposed manner on a video of the floor panel Z', to the worker.

According to the above configuration, the virtual image representing this network cable is presented on the floor surface along the position of the network cable laid on the free access floor, to the worker via the HMD.

Thereby, according to the failure analysis system according to the embodiment of the present invention, if the worker has received a work instruction to confirm the network cable as the content of the fault repair work, the worker can easily find where the network cable that is the target is laid to run on the free access floor, and thus the working efficiency for the worker can be improved.

It should be noted that the present invention is not limited to each embodiment described above, various changes can be made within the scope shown in the claims, and any embodiment that can be obtained in an appropriate combination of technical means disclosed in different embodiments respectively is also included in the technical scope of the present invention.

The embodiments of the present invention can be realized by a computer executing a program. Moreover, means for supplying the program to computer, for example, a computer-readable recording medium such as a CD-ROM, having recorded therein this program, or a transmission medium for transmitting this program is also applicable as an embodiment of the present invention. Moreover, a program product such as the above computer-readable recording medium having recorded therein the program is also applicable as an embodiment of the present invention. The program, the computer-readable recording medium, the transmission medium and the program product as described above are included in the category of the present invention.

INDUSTRIAL APPLICABILITY

The present invention is useful for augmented reality capable of synthesizing and displaying an image of real space and computer graphics image data in a superimposed manner.

The invention claimed is:

1. An information processing system comprising a sense of augmented reality presentation apparatus that is able to synthesize and display an image of real space and computer graphics image data, and a failure analysis apparatus that is able to analyze a fault having occurred in a computer system, wherein the failure analysis apparatus comprises:
   obtaining means that obtains information associated with an operational status of the computer system;
   determination means that determines information regarding fault repair work for the computer system based on the information associated with the operational status obtained by the obtaining means, a required ability level for taking charge of the fault repair work, and rule data comprising priority weighting of each of a plurality of check items determined for the fault repair work; and
   transmission means that transmits the information regarding the fault repair work determined by the determination means, to the sense of augmented reality presentation apparatus,
the sense of augmented reality presentation apparatus comprises:
   presentation means that synthesizes and presents computer graphics image data for providing guidance for a method of the fault repair work, with the image of the real space, based on the information regarding the fault repair work, and
in the failure analysis apparatus:
   after performing the fault repair work according to the guidance presented by the sense of augmented reality presentation apparatus, and in response to the information associated with the operational status of the computer system being newly obtained by the obtaining means, the information regarding the fault repair work for the computer system is newly determined by the determination means based on the information associated with the operational status, a determined proficiency level of a worker who has performed the fault repair work, and security information associated with the worker, and the newly determined information regarding the fault repair work is transmitted to the sense of augmented reality presentation apparatus by the transmission means.

2. The information processing system according to claim 1, wherein
in the failure analysis apparatus, information regarding pieces of fault repair work to be individually executed for the computer system by a plurality of workers is determined by the determination means based on the information associated with the operational status of the computer system, and a method of each piece of the fault repair work is transmitted to the sense of augmented reality presentation apparatus of each corresponding worker by the transmission means.

3. The information processing system according to claim 1, wherein in the failure analysis apparatus, guidance information for providing guidance for a route from a current location of the sense of augmented reality presentation apparatus to a location of the fault repair work is transmitted to the sense of augmented reality presentation apparatus by the transmission means, and
in the sense of augmented reality presentation apparatus, computer graphics image data for providing the guidance for the route from the current location of the sense of augmented reality presentation apparatus to the location of the fault repair work is synthesized and presented with the image of the real space by the presentation means based on the guidance information.

4. The information processing system according to claim 1, wherein based on a result of executing the fault repair work according to the guidance presented by the sense of augmented reality presentation apparatus, the determination means determines the proficiency level of the worker who has performed the fault repair work, and
in the failure analysis apparatus,
after performing the fault repair work according to the guidance presented by the sense of augmented reality presentation apparatus, and in response to the information regarding the fault repair work for the computer system being newly determined, information representing an explanation of work content depending on the proficiency level, with respect to the newly determined information regarding the fault repair work, is transmitted to the sense of augmented reality presentation apparatus.

5. The information processing system according to claim 2, wherein based on a result of executing the fault repair work according to the guidance presented by the sense of augmented reality presentation apparatus, the determination means determines the proficiency level of the worker who has performed the fault repair work, and
in the failure analysis apparatus,
when the information regarding the pieces of the fault repair work to be individually executed for the computer system by the plurality of workers is determined by the determination means based on the information associated with the operational status of the computer system, the piece of the fault repair work that the worker takes charge of is decided depending on the proficiency level.

6. The information processing system according to claim 1, wherein the failure analysis apparatus further comprises position specification means that specifies a position of a network cable laid on a free access floor,
the transmission means transmits position information representing the position of the network cable specified by the position specification means to the sense of augmented reality presentation apparatus, as a part of the information regarding the fault repair work determined by the determination means, and in the sense of augmented reality presentation apparatus,
the presentation means synthesizes and presents the network cable, as the computer graphics image data for providing the guidance for the method of the fault repair work, with the image of the real space, based on the position information included in the information regarding the fault repair work.

7. An information processing method executed by a sense of augmented reality presentation apparatus that is able to synthesize and display an image of real space and computer graphics image data and comprises presentation means, and a failure analysis apparatus that is able to analyze a fault having occurred in a computer system and comprises obtaining means, determination means and transmission means, the method comprising:
an obtaining step of obtaining information associated with an operational status of the computer system by the obtaining means;
a determination step of determining information regarding fault repair work for the computer system based on the information associated with the operational status obtained by the obtaining step, a required ability level for taking charge of the fault repair work, and rule data comprising priority weighting of each of a plurality of check items determined for the fault repair work;
a transmission step of transmitting the information regarding the fault repair work determined by the determination step, to the sense of augmented reality presentation apparatus, by the transmission means; and
a presentation step of synthesizing and presenting computer graphics image data for providing guidance for a method of the fault repair work, with the image of the real space, based on the information regarding the fault repair work, by the presentation means, wherein
after performing the fault repair work according to the guidance presented by the sense of augmented reality presentation apparatus, and in response to the information associated with the operational status of the computer system being newly obtained by the obtaining means, the information regarding the fault repair work for the computer system is newly determined by the determination means based on the information associated with the operational status, a determined proficiency level of a worker who has performed the fault repair work, and security information associated with the worker, and the newly determined information regarding the fault repair work is transmitted to the sense of augmented reality presentation apparatus by the transmission means.

8. A program stored on a non-transitory computer readable medium for causing a first computer to function as a sense of augmented reality presentation apparatus that is able to synthesize and display an image of real space and computer graphics image data, and comprises presentation means, and for causing a second computer to function as a failure analysis apparatus that is able to analyze a fault having occurred in a computer system and comprises obtaining means, determination means and transmission means, the program causing the second computer to execute:

an obtaining step of obtaining information associated with an operational status of the computer system by the obtaining means;

a determination step of determining information regarding fault repair work for the computer system based on the information associated with the operational status obtained by the obtaining step, a required ability level for taking charge of the fault repair work, and rule data comprising priority weighting of each of a plurality of check items determined for the fault repair work; and a transmission step of transmitting the information regarding the fault repair work determined by the determination step, to the first computer, by the transmission means, the program causing the first computer to execute:

a presentation step of synthesizing and presenting computer graphics image data for providing guidance for a method of the fault repair work, with the image of the real space, based on the information regarding the fault repair work, by the presentation means, and the program causing the second computer to execute:

a step in which, after performing the fault repair work according to the guidance presented by the first computer, and in response to the information associated with the operational status of the computer system being newly obtained by the obtaining step, the information regarding the fault repair work for the computer system is newly determined by the determination step based on the information associated with the operational status, a determined proficiency level of a worker who has performed the fault repair work, and security information associated with the worker, and the newly determined information regarding the fault repair work is transmitted to the first computer by the transmission step.

9. An information processing system comprising a sense of augmented reality presentation apparatus that is able to synthesize and display an image of real space and computer graphics image data, and a failure analysis apparatus that is able to analyze a fault having occurred in a repair target object, wherein the failure analysis apparatus comprises:

obtaining means that obtains information associated with an operational status of the repair target object;

determination means that determines information regarding fault repair work for the repair target object based on the information associated with the operational status obtained by the obtaining means, a required ability level for taking charge of the fault repair work, and rule data comprising priority weighting of each of a plurality of check items determined for the fault repair work; and transmission means that transmits information indicating the information regarding the fault repair work determined by the determination means, to the sense of augmented reality presentation apparatus, the sense of augmented reality presentation apparatus comprises:

presentation means that synthesizes and presents computer graphics image data for providing guidance for a method of the fault repair work, with the image of the real space, based on the information regarding the fault repair work, and in the failure analysis apparatus:

after performing the fault repair work according to the guidance presented by the sense of augmented reality presentation apparatus, and in response to the information associated with the operational status of the repair target object being newly obtained by the obtaining means, the information regarding the fault repair work for the repair target object is newly determined by the determination means based on the information associated with the operational status, a determined proficiency level of a worker who has performed the fault repair work, and security information associated with the worker, and the newly determined information regarding the fault repair work is transmitted to the sense of augmented reality presentation apparatus by the transmission means.

* * * * *